(12) United States Patent
Lee et al.

(10) Patent No.: US 11,575,267 B2
(45) Date of Patent: Feb. 7, 2023

(54) CHARGER INTEGRATED CIRCUIT FOR CHARGING BATTERY DEVICE AND ELECTRONIC DEVICE INCLUDING SAME

(71) Applicant: SAMSUNG ELECTRONICS CO., LTD., Suwon-si (KR)

(72) Inventors: Sungwoo Lee, Hwaseong-si (KR); Minkyu Kwon, Hwaseong-si (KR); Hyoungseok Oh, Seoul (KR); Yonghwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/011,065

(22) Filed: Sep. 3, 2020

(65) Prior Publication Data

US 2021/0281085 A1     Sep. 9, 2021

(30) Foreign Application Priority Data

Mar. 9, 2020 (KR) .................. 10-2020-0029162

(51) Int. Cl.
*H02J 7/00* (2006.01)
*H01M 10/44* (2006.01)
*H01M 10/48* (2006.01)

(52) U.S. Cl.
CPC ......... *H02J 7/0019* (2013.01); *H01M 10/441* (2013.01); *H01M 10/482* (2013.01); *H02J 7/0024* (2013.01); *H02J 7/007182* (2020.01); *H01M 2220/30* (2013.01); *H02J 2310/22* (2020.01)

(58) Field of Classification Search
USPC ................................................ 320/109, 112
See application file for complete search history.

(56) References Cited

U.S. PATENT DOCUMENTS

| 9,537,331 | B2 | 1/2017 | Kim et al. |
| 2011/0055037 | A1* | 3/2011 | Hayashigawa ......... B60L 53/16 705/26.1 |
| 2017/0117724 | A1 | 4/2017 | Kong |
| 2018/0345806 | A1 | 12/2018 | Lee et al. |
| 2019/0126761 | A1* | 5/2019 | Verbridge ........... H01M 10/441 |
| 2019/0214833 | A1* | 7/2019 | Li ........................ H01M 10/441 |
| 2020/0047637 | A1* | 2/2020 | Nakao ..................... B60L 53/66 |
| 2020/0127467 | A1* | 4/2020 | Li .......................... H02J 7/0072 |
| 2020/0185936 | A1* | 6/2020 | Oishi ..................... B60L 53/63 |

FOREIGN PATENT DOCUMENTS

| CN | 105703424 A | * | 6/2016 |
| JP | 2006-197676 A | | 7/2006 |
| JP | 5440400 B2 | | 3/2014 |
| JP | 2018-037392 A | | 3/2018 |
| KR | 10-01845793 B1 | | 4/2018 |

* cited by examiner

*Primary Examiner* — Samuel Berhanu
(74) *Attorney, Agent, or Firm* — Volentine, Whitt & Francos, PLLC

(57) ABSTRACT

A charger integrated circuit for charging a battery device including a first battery and a second battery includes; a first charger configured to generate a first charging current from an input voltage when the input voltage is received from an input voltage terminal, and a battery switch configured to provide the first charging current to the battery device, the battery switch comprising a plurality of transistors for connecting the first battery and the second battery in series or in parallel based on the input voltage, a first both-end voltage of the first battery and a second both-end voltage of the second battery.

20 Claims, 24 Drawing Sheets

FIRST CHARGING MODE

SECOND CHARGING MODE

FIRST DISCHARGING MODE

SECOND DISCHARGING MODE

CHARGER INTEGRATED CIRCUIT FOR CHARGING BATTERY DEVICE AND ELECTRONIC DEVICE INCLUDING SAME

CROSS-REFERENCE TO RELATED APPLICATION

This application claims the benefit of Korean Patent Application No. 10-2020-0029162, filed on Mar. 9, 2020 in the Korean Intellectual Property Office, the subject matter of which is hereby incorporated by reference.

BACKGROUND

The inventive concept relates to charger integrated circuits, and more particularly, to charger integrated circuits capable of charging a battery device including multiple batteries using a battery switch. The inventive concept also relates to electronic devices including this type of charger integrated circuit.

Portable electronic devices such as mobile phones include batteries. The power demands placed upon mobile phone batteries has gradually increased over time, and now faces further increase with the advent of 5G technology and applications. And it is possible that current battery technology, battery power storing capacity and battery charging approaches may unduly limit the operating performance of emerging mobile phones. Accordingly, improved battery technology, improved battery charging efficiency, increased battery power storage capacities, as well as longer, useful battery lives are subjects of ongoing research and developmental.

SUMMARY

According to an aspect of the inventive concept, there is provided a charger integrated circuit (IC) for charging a battery device including a first battery and a second battery that includes; a first charger configured to generate a first charging current from an input voltage when the input voltage is received from an input voltage terminal, and a battery switch configured to provide the first charging current to the battery device, the battery switch comprising a plurality of transistors for connecting the first battery and the second battery in series or in parallel based on the input voltage, a first both-end voltage of the first battery and a second both-end voltage of the second battery.

According to an aspect of the inventive concept, there is provided a charger IC for charging a battery device including a first battery and a second battery that includes; a direct charger configured to generate a first charging current from an input voltage received from an input voltage terminal, a switching charger configured to generate a second charging current from the input voltage, and a battery switch configured to provide one of the first charging current and the second charging current to the battery device, wherein the battery switch comprises a plurality of transistors for connecting the first battery and the second battery in series or in parallel based on the input voltage, a first both-end voltage of the first battery, and a second both-end voltage of the second battery, wherein at least one of the plurality of transistors performs a current control function limiting one of a first battery current applied to the first battery and a second battery current applied to the second battery.

According to an aspect of the inventive concept, there is provided a battery switch connectable to a battery device including a first battery and second battery and including; a first transistor connected between a first node and a ground terminal, the first node being configured to connect a negative terminal of the first battery, a second transistor connected between the first node and a second node, the second node being configured to connect a positive terminal of the second battery, a third transistor connected to a third node connectable to a positive terminal of the first battery, and a fourth transistor connected between the second node and the third transistor, wherein when the second transistor is turned ON, the battery switch connects the first battery and the second battery in series, when the first transistor, the third transistor, and the fourth transistor are turned ON, the battery switch connects the first battery and the second battery in parallel, and at least one of the first transistor, the second transistor, the third transistor and the fourth transistor performs a current control function limiting at least one of a first battery current applied to the first battery and a second battery current applied to the second battery.

According to an aspect of the inventive concept, there is provided an electronic device including; a battery device including a first battery and a second battery, a charger configured to generate a charging current from an input voltage received from an input voltage terminal, and a battery switch configured to provide the charging current to the battery device, the battery switch comprising a plurality of transistors for connecting the first and second batteries in series or in parallel based on the input voltage, a first both-end voltage of the first battery, and a second both-end voltage of the second battery, wherein at least one of the plurality of transistors performs a current control function limiting at least one of a first battery current applied to the first battery and a second battery current applied to the second battery.

According to an aspect of the inventive concept, there is provided a battery device connectable to an electronic device and including; a plurality of batteries including a first battery and a second battery, and a battery switch configured to provide to the battery device, a charging current received from the electronic device, the battery switch comprising a plurality of transistors for connecting the first and second batteries in series or in parallel. The plurality of transistors includes; a first transistor connected between a negative terminal of the first battery and a ground terminal, a second transistor connected between the negative terminal of the first battery and a positive terminal of the second battery, a third transistor connected to a positive terminal of the first battery, and a fourth transistor connected between the third transistor and the positive terminal of the second battery, and at least one of the plurality of transistors performs a current control function limiting at least one of a first battery current applied to the first battery and a second battery current applied to the second battery.

According to an aspect of the inventive concept, there is provided an electronic device including a battery device including a first battery and a second battery, a switching charger configured to generate a first charging current applied to the battery device when activated in a first charging mode and when a travel adapter is connected to an input voltage terminal, a direct charger configured to generate a second charging current applied to the battery device when activated in a second charging mode different from the first charging mode and when the travel adapter is connected to the input voltage terminal; and battery switch. The battery switch includes a first transistor connected between a first node and a ground terminal, the first node being configured to connect a negative terminal of the first battery, a second transistor connected between the first node and a second node, the second node being configured to connect a positive terminal of the second battery, a third transistor connected to a third node configured to connect a positive terminal of the first battery, and a fourth transistor connected between the second node and the third transistor. When the second transistor is turned ON, the first battery and the second battery are connected in series, and when the first transistor, third transistor and fourth transistors are turned ON, the first battery and the second battery are connected in parallel, and the switching charger and the direct charger are inactivated in a discharging mode when the travel adapter is not applied to the input voltage terminal and the first battery charges the second battery.

BRIEF DESCRIPTION OF THE DRAWINGS

Embodiments of the inventive concept will be more clearly understood from the following detailed description taken in conjunction with the accompanying drawings in which.

DETAILED DESCRIPTION

Embodiments of the inventive concept will now be described in some additional detail with reference to the accompanying drawings.

Figure (FIG.) 1 is a block diagram illustrating an electronic device 10 according to embodiments of the inventive concept.

Figure 1:
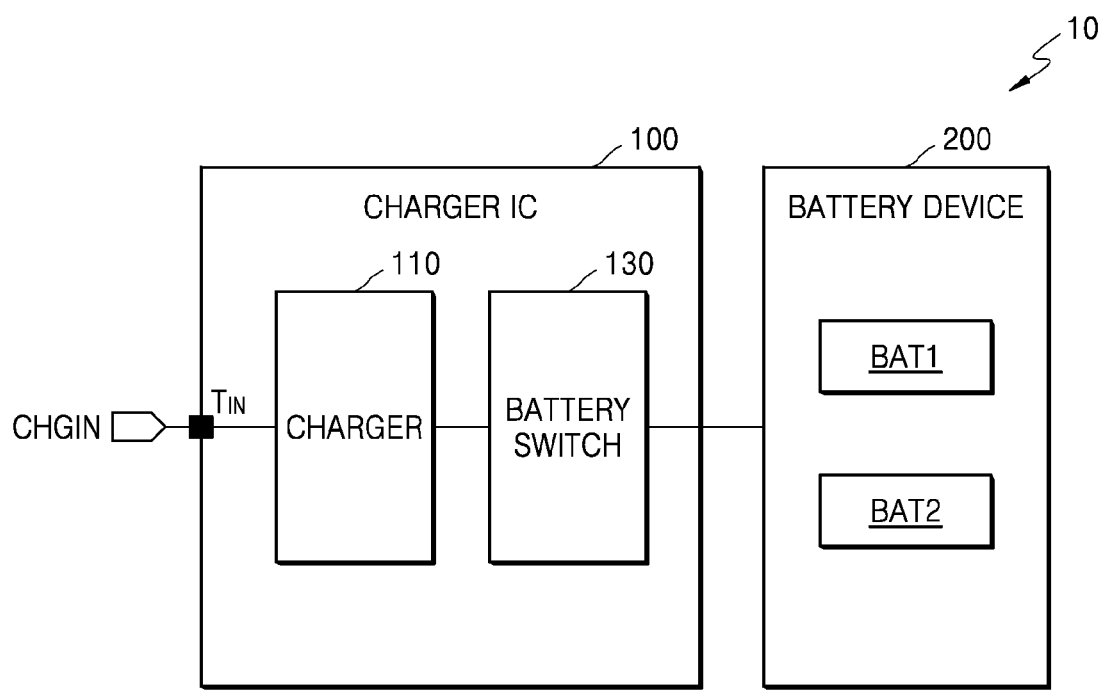
FIGS. 1, 2, 3 and 4 are respective block diagrams illustrating electronic devices according to embodiments of the inventive concept.

Referring to FIG. 1, the electronic device 10 may include a charger integrated circuit (IC) 100 which may be referred to as a "battery charger." For example, the charger IC 100 may be implemented by an integrated circuit chip mounted on a printed circuit board (PCB). The electronic device 10 may take one of many forms including, for example, a mobile device such as a smart phone, a tablet personal computer (PC), a mobile phone, a personal digital assistant (PDA), a wearable device, a global positional system (GPS) device, an electronic-book (e-book) reader, a digital broadcasting terminal, an MP3 player, a digital camera, an electronic toy, etc. Alternately, the electronic device 10 may be included in a vehicle, such as an electric vehicle.

In addition to the charger IC 100, the electronic device 10 may include a battery device 200. Here, the battery device 200 may be embedded in the electronic device 10 or may be mechanically attachable/detachable to the electronic device 10. The battery device 200 may include a first battery BAT1 and a second battery BAT2, wherein the first and second batteries BAT1 and BAT2 may be selectively connected in series or in parallel. In some embodiments, the battery device 200 may include more than two batteries. As such, the electronic device 10 may be capable of high-performance operation using the battery device 200 including a plurality of batteries.

In this regard, the first battery BAT1 may be a first battery cell, a first multi-cell arrangement of batteries, or a first battery pack. The second battery BAT2 may be a second battery cell, a second multi-cell arrangement of batteries, or a second battery pack. Accordingly, the battery device 200 may be variously configured as an arrangement of multiple batteries, and may be variously implemented using at least one battery pack. For example, the first battery BAT1 may be a first battery pack, the second battery BAT2 may be a second battery pack and the battery device 200 may be implemented by a battery device including a plurality of battery packs. In certain embodiments, at least one of the first battery pack and the second battery packs may be a multi-cell battery including two or more battery cells, and at least one of the first battery pack and the second battery pack may be a single-cell battery including one battery cell.

The charger IC 100 of FIG. 1 may include a charger 110 and a battery switch 130 configured to charge the battery device 200. In certain embodiments, the charger 110 and the battery switch 130 may be commonly implemented in a single integrated circuit (IC). However, the inventive concept is not limited thereto, and in some embodiments, the charger 110 and the battery switch 130 may be respectively implemented using separate ICs.

The charger 110 may include multiple chargers, wherein at least one of the chargers may operate in a charging mode or a discharging mode.

The charger IC 100 may also include an input voltage terminal $T_{IN}$ at which an input voltage CHGIN may be applied. In certain embodiments, the input voltage terminal $T_{IN}$ may be electrically connected to an external power supply by a travel adapter (TA).

Those skilled in the art will recognize that a travel adapter (possibly one selected from a number of available travel adapters) may be used to convert an external power supply voltage (e.g., a nominal 110 V or 220 V power supply) into an input voltage CHGIN (e.g., a DC voltage) compatible with an electronic device (e.g., a computer or smart phone). The input voltage CHGIN may also be used to charge the battery device 200.

In this regard, the input voltage terminal $T_{IN}$ may be electrically connected to an output terminal of an auxiliary battery. Alternatively, the input voltage terminal $T_{IN}$ may be electrically connected to another electronic device (e.g., another smart phone). Regardless of external connection type, the charger IC 100 may be used to charge the battery device 200 using the input voltage (e.g., a DC power voltage) provided by the travel adapter TA, an auxiliary battery, etc.

Thus, in response to the input voltage CHGIN received from the input voltage terminal $T_{IN}$, the charger IC 100 may generate a charging current from the input voltage CHGIN to charge the battery device 200. For example, the charger 110 may include a direct charger. However, the inventive concept is not limited thereto and alternately, the charger 110 may include a switching charger and/or a linear charger. In certain embodiments, the charger IC 100 may include multiple chargers, one of the multiple chargers may be selected for operation in accordance with a charging mode, and the selected charger may then be used to generate a charging current.

The battery switch 130 may be used to variously connect (or be variably configured to connect) the first and second batteries BAT1 and BAT2 in series or in parallel in response to the input voltage CHGIN. For example, the battery switch 130 may variously connect a first both-end voltage of the first battery BAT1 and a second both-end voltage of the second battery BAT2 within the battery device 200 in order to provide a charging current generated by the charger 110. In certain embodiments, the battery switch 130 may connect the first and second batteries BAT1 and BAT2 in series or in parallel according to the type of travel adapter TA connected to the input voltage terminal $T_{IN}$. For example, the battery switch 130 may connect the first and second batteries BAT1 and BAT2 to each other in series or in parallel according to a voltage difference between the first both-end voltage of the first battery BAT1 and the second both-end voltage of the second battery BAT2.

In addition, by selectively configuring the battery switch 130, a voltage balancing operation (hereafter, "balancing") between the first both-end voltage of the first battery BAT1 and the second both-end voltage of the second battery BAT2 may be performed. Specifically, by using the battery switch 130, the relatively undercharged battery among of the first and second batteries BAT1 and BAT2 may be charged using energy from the relatively overcharged battery among the first and second batteries BAT1 and BAT2, thereby balancing the first and second both-end voltages of the first and second batteries BAT1 and BAT2. This approach will be described hereafter in some additional detail with reference to FIGS. 8 and 9.

In certain embodiments, the charger IC 100 may further include a circuit or block supporting one or more additional functions, such as an under-voltage lockout (UVLO) function, an over-current protection (OCP) function, an over-voltage protection (OVP) function, a soft-start function reducing in-rush current, a foldback current limit function, a hiccup mode function for short circuit protection, and an over-temperature protection (OTP) function, etc. These optionally provided function(s) allow the charger IC 100 to operate properly under a variety of conditions (e.g., power saving conditions, environmental conditions, etc.).

Figure 2:
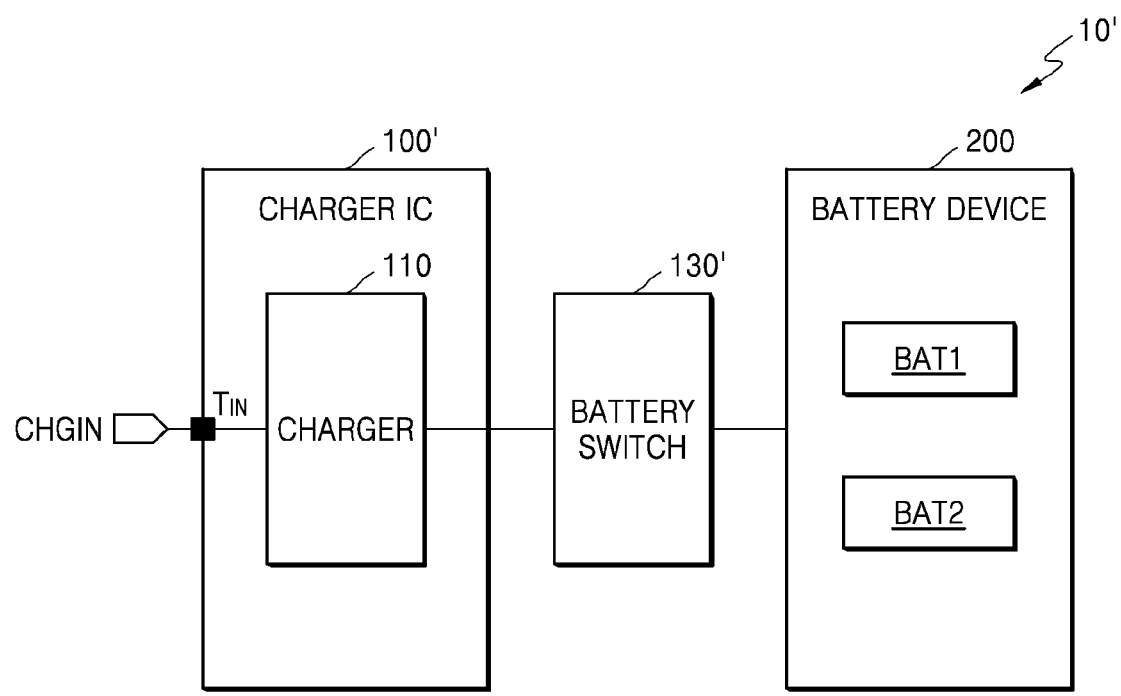

FIG. 2 is a block diagram illustrating an electronic device 10' according to embodiments of the inventive concept.

Referring to FIG. 2, the electronic device 10' is substantially similar to the electronic device 10 of FIG. 1 and includes a charger IC 100', a battery switch 130', and the battery device 200. Here, however, the battery switch 130' is disposed external to the charger IC 100'. For example, the battery switch 130' may be implemented by a battery switch chip.

Figure 3:
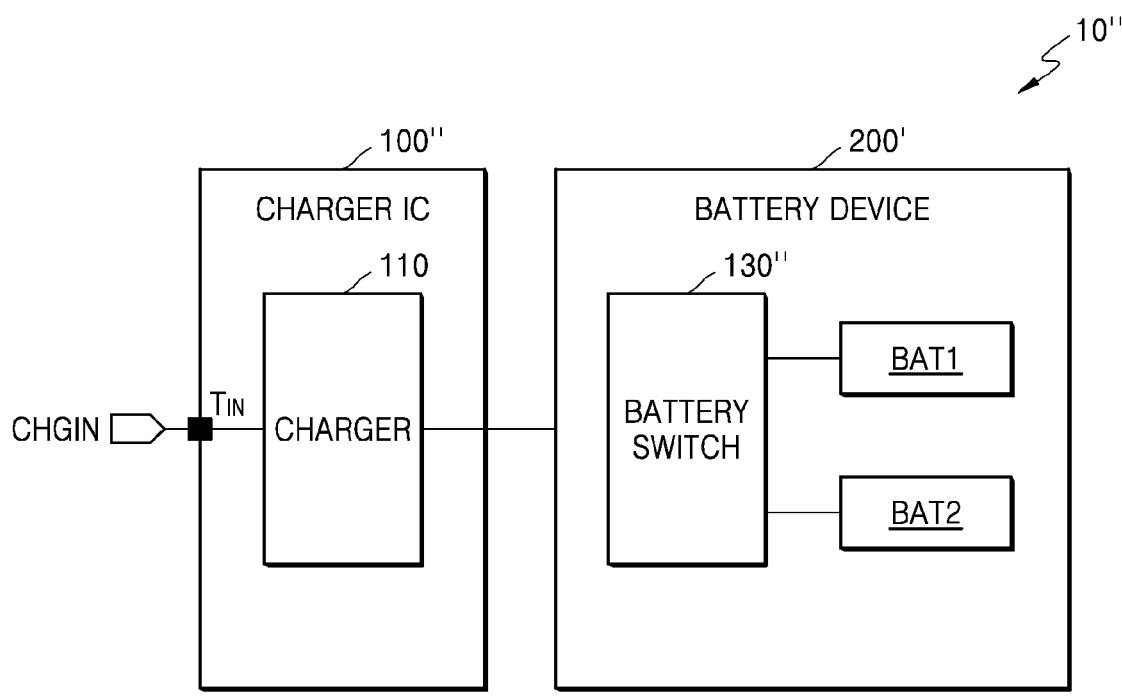

FIG. 3 is a block diagram illustrating an electronic device 10' according to embodiments of the inventive concept.

Referring to FIG. 3, the electronic device 10" is substantially similar to the electronic device 10 of FIG. 1 and includes a charger IC 100", a battery switch 130" and a battery device 200'. Here, however, the battery switch 130" is disposed within the battery device 200'.

Figure 4:
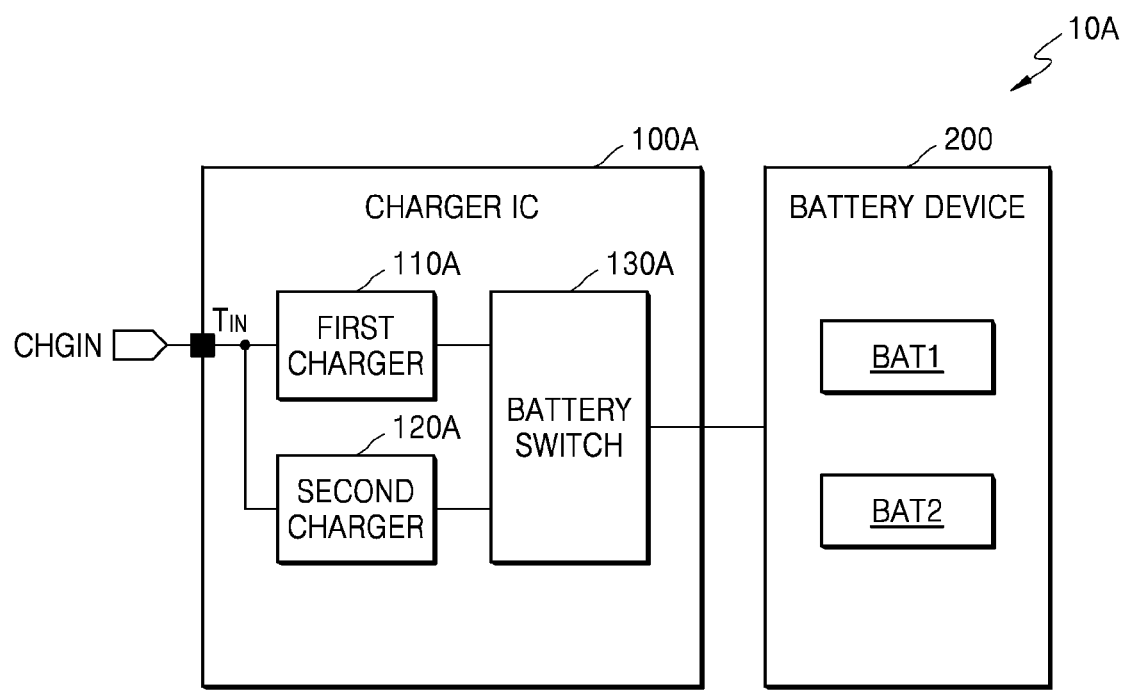

FIG. 4 is a block diagram illustrating an electronic device 10A according to embodiments of the inventive concept.

Referring to FIG. 4, the electronic device 10A may include a charger IC 100A and the battery device 200, where the charger IC 100A includes a first charger 110A, a second charger 120A and a battery switch 130A.

The first charger 110A receives the input voltage CHGIN from the input voltage terminal $T_{IN}$ and generates a first charging current in response to the input voltage CHGIN. In the illustrated example of FIG. 4, the first charger 110A is assumed to be a direct charger that may be activated in a high-speed charging mode to quickly charge the battery device 200 using the first charging current. The high-speed charging mode may correspond, for example, to a case wherein the input voltage CHGIN is able to be precisely controlled, or a case wherein the input voltage CHGIN has a variable voltage level. For example, when a connected travel adapter TA supports universal serial bus power delivery (USB PD) 3.0 operation, the first charger 110A may be activated.

The second charger 120A also receives the input voltage CHGIN from the input voltage terminal $T_{IN}$ and generates a second charging current in response to the received input voltage CHGIN. In the illustrated example of FIG. 4, the second charger 120A is assumed to be a switching charger or a linear charger that may be activated in a normal charging mode. The normal charging mode may correspond, for example, to a case wherein the input voltage CHGIN cannot be precisely controlled, or a case wherein the input voltage CHGIN has a fixed voltage level. For example, when a connected travel adapter TA supports a low-voltage (e.g., 5 V) operation, the second charger 120A may be activated.

The battery switch 130A may be connected to the first and second chargers 110A and 120A in such a manner as to provide the first charging current and/or the second charging current to the battery device 200. For example, the battery switch 130A may include transistors selectively configurable to connect the first and second batteries BAT1 and BAT2 in series or in parallel in response to (or based on) the input voltage CHGIN. Accordingly, the first charging current generated by the first charger 110A or the second charging current generated by the second charger 120A may variously be applied to the first both-end voltage of the first battery BAT1 and/or the second both-end voltage of the second battery BAT2 within the battery device 200.

Figure 5:
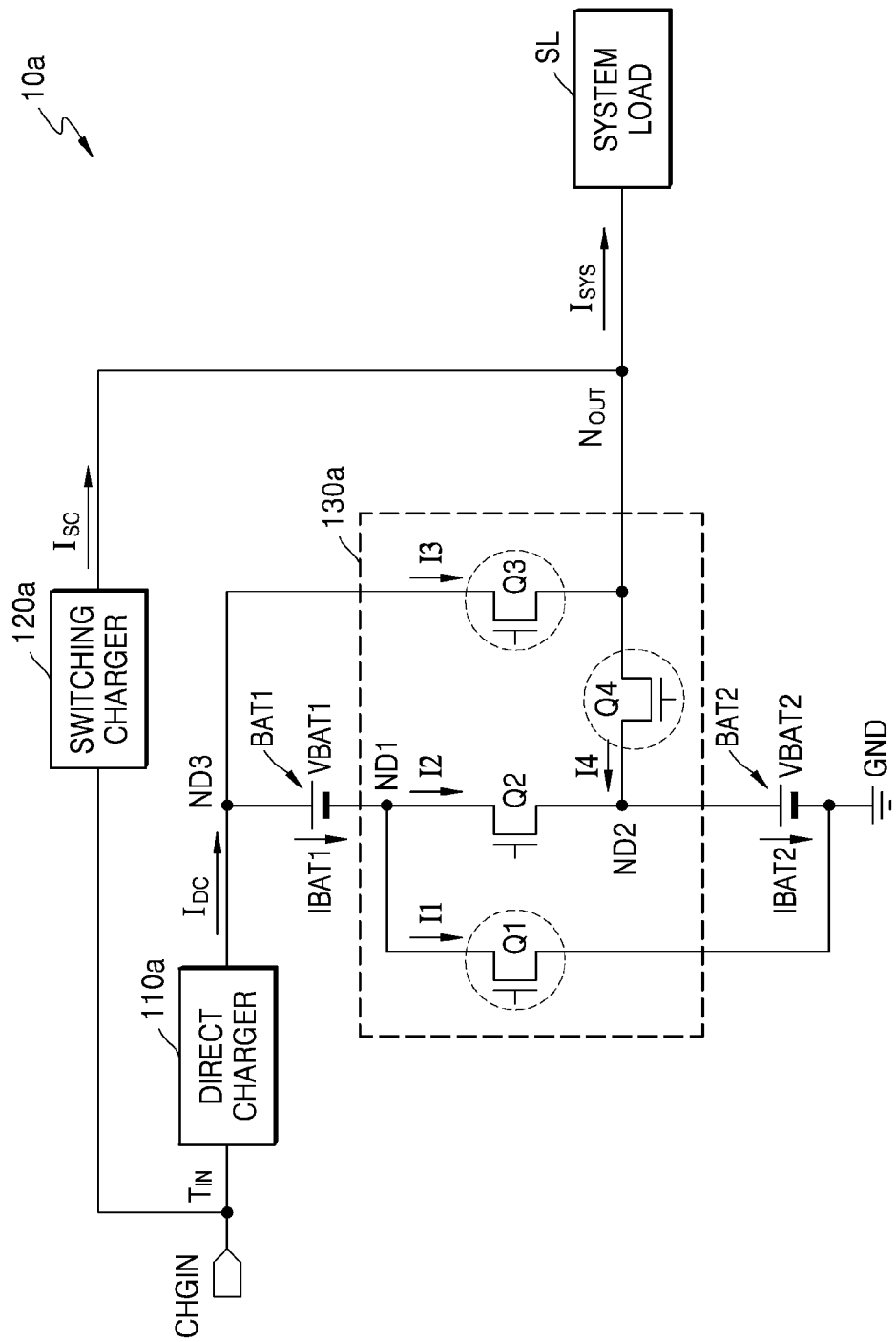
FIGS. 5 and 6 are block diagrams respectively illustrating electronic devices according to embodiments of the inventive concept.

FIG. 5 is a block diagram illustrating an electronic device 10a according to embodiments of the inventive concept.

Referring to FIG. 5, the electronic device 10a may include a direct charger 110a, a switching charger 120a, a battery switch 130a, the first and second batteries BAT1 and BAT2, and a system load SL. Here, the system load SL may include various circuitry and or constituent component(s) of the electronic device 10a, such as a modem, an application processor, one or more memories, a display, etc. Alternately or additionally, the system load SL may include an operation block, a functional block, or an intellectual property (IP) block, such as a multimedia block inside an application processor, a memory controller, etc. The system load SL may also be referred to simply as a load, or a power consumption block.

In certain embodiments, the direct charger 110a of FIG. 5 may be the first charger 110A of FIG. 4. That is, the direct charger 110a may be activated in the high-speed charging mode to directly charge the first and second batteries BAT1 and BAT2 by providing a first charging current $I_{DC}$ to the first and second batteries BAT1 and BAT2. The direct charger 110a may directly charge the first and second batteries BAT1 and BAT2 in a direct charging manner in which the input voltage CHGIN is directly connected to the first and second batteries BAT1 and BAT2. Generally speaking, the charging efficiency of a direct charging approach is greater than the charging efficiency of a switching charging approach.

In certain embodiments, the switching charger 120a of FIG. 4 may be the second charger 120A of FIG. 4. That is, the switching charger 120a may be activated in the normal charging mode to charge the first and second batteries BAT1 and BAT2 by providing a second charging current $I_{SC}$ to the first and second batteries BAT1 and BAT2. However, the inventive concept is not limited thereto, and the switching charger 120a may be activated in the high-speed charging mode to provide the second charging current $I_{SC}$ to the system load SL.

In the illustrated example of FIG. 5, the battery switch 130a includes first, second, third and fourth transistors Q1, Q2, Q3, and Q4 (hereafter collectively, first to fourth transistors). The first transistor Q1 may be arranged between a first node ND1, which is connectable to a negative terminal of the first battery BAT1, and a ground terminal GND. The second transistor Q2 may be arranged between the first node ND1 and a second node ND2, which is connectable to a positive terminal of the second battery BAT2. The third transistor Q3 may be arranged between a third node ND3, which is connectable to a positive terminal of the first battery BAT1, and an output node $N_{OUT}$. The fourth transistor Q4 may be arranged between the output node $N_{OUT}$ and the second node ND2.

When the first and second batteries BAT1 and BAT2 are connected in parallel, the first, third, and fourth transistors Q1, Q3, and Q4 may be turned ON, and the second transistor Q2 may be turned OFF. When the first and second batteries BAT1 and BAT2 are connected in series, the second transistor Q2 may be turned ON, and the first and third transistors Q1 and Q3 may be turned OFF. Here, when a system current $I_{SYS}$ is provided to the system load SL, the fourth transistor Q4 may be turned ON, or otherwise, the fourth transistor Q4 may be turned OFF.

In certain embodiments, at least one of the first to fourth transistors Q1 to Q4 may be used as a switch. For example, when the second transistor Q2 is turned OFF, a current is not able to flow through the second transistor Q2. For example, when the second transistor Q2 is turned ON, a current is able to flow through the second transistor Q2. Here, the second transistor Q2 may be fully turned ON, or be saturated.

In an embodiment, at least one of the first to fourth transistors Q1 to Q4 may be used as a variable resistor providing a current control function. For example, at least one of the first and third transistors Q1 and Q3 may have a current control function upon charging the first battery BAT1. Specifically, at least one of the first and third transistors Q1 and Q3 may control a first battery current IBAT1 applied to the first battery BAT1, upon charging of the first battery BAT1. In addition, the fourth transistor Q4 may have a current control function upon charging the second battery BAT2. Specifically, the fourth transistor Q4 may control a second battery current IBAT2 applied to the second battery BAT2, upon charging of the second battery BAT2. In certain embodiments, the direct charger 110a, the switching charger 120a, and the battery switch 130a may be implemented within a charger IC (e.g., the charger IC 110A of FIG. 4).

Figure 6:
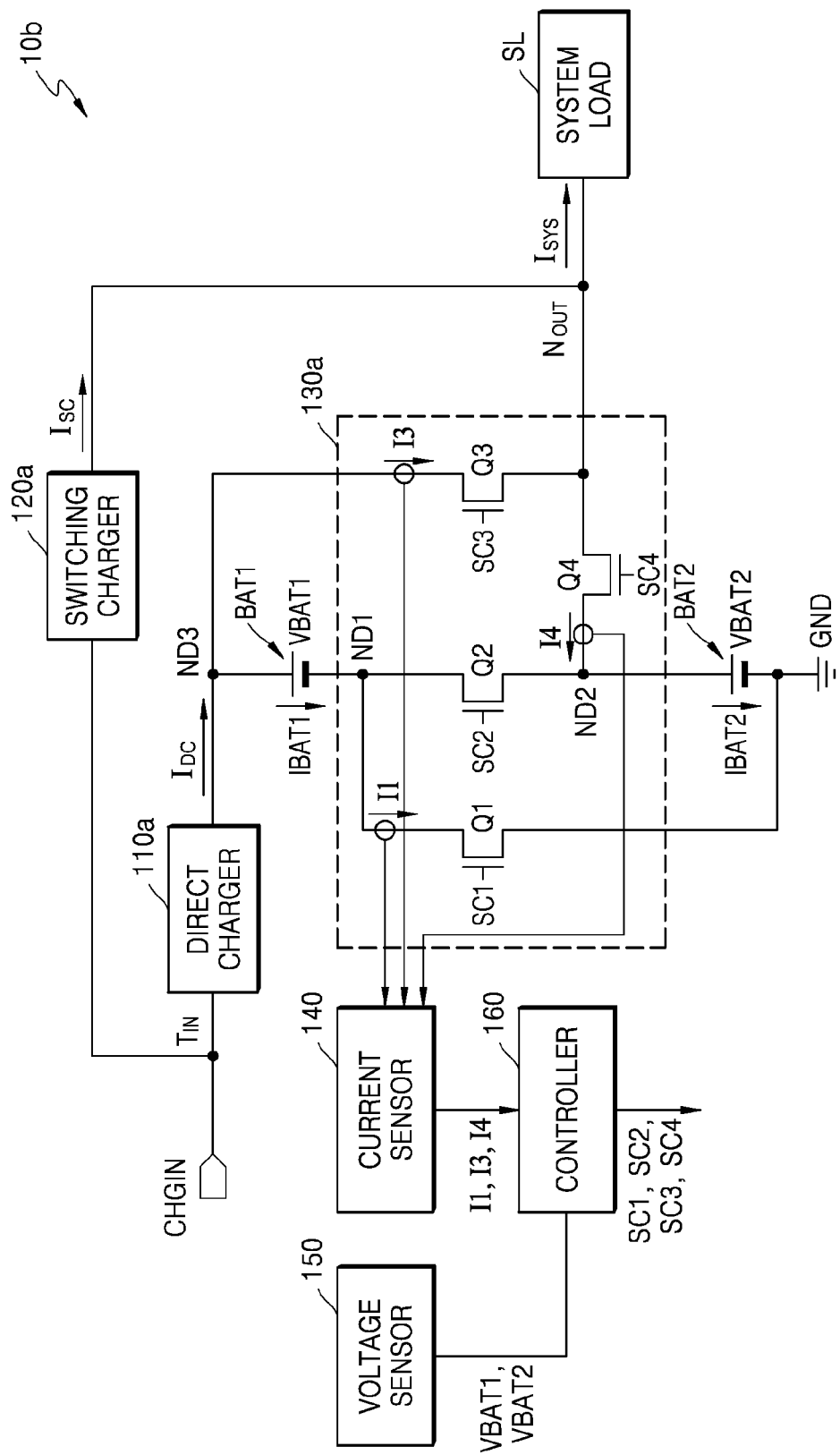

FIG. 6 is a block diagram illustrating an electronic device 10b according to embodiments of the inventive concept.

Referring to FIG. 6, the electronic device 10b is substantially similar to the electronic device 10a of FIG. 5, except for the addition of a current sensor 140, a voltage sensor 150 and a controller 160 (e.g., an application processor). Here, it is assumed that the direct charger 110a, the switching charger 120a and the battery switch 130a, as well as the current sensor 140, the voltage sensor 150 and the controller 160 are implemented within a charger IC. Alternately, however, the current sensor 140, the voltage sensor 150 and the controller 160 may be disposed external to the charger IC.

The current sensor 140 may sense a first current I1 flowing through the first transistor Q1, a third current I3 flowing through the third transistor Q3, and a fourth current I4 flowing through the fourth transistor Q4. The voltage sensor 150 may sense a first both-end voltage VBAT1 of the first battery BAT1 and a second both-end voltage VBAT2 of the second battery BAT2.

The controller 160 may determine whether to connect the first and second batteries BAT1 and BAT2 in series or in parallel based on the input voltage CHGIN and the first and second both-end voltages VBAT1 and VBAT2, and may accordingly generate first, second, third and fourth control signals SC1, SC2, SC3, and SC4 respectively controlling the first to fourth transistors Q1 to Q4 according to the determination results. For example, having determined to connect the first and second batteries BAT1 and BAT2 in series, the controller 160 may generate the first, second and third control signals SC1, SC2, and SC3, such that the second transistor Q2 is turned ON and the first and third transistors Q1 and Q3 are turned OFF. Alternately, having determined to connect the first and second batteries BAT1 and BAT2 in parallel, the controller 160 may generate the first, second, third and fourth control signals SC1, SC2, SC3, and SC4, such that the second transistor Q2 is turned OFF and the first, third, and fourth transistors Q1, Q3, and Q4 are turned ON.

In certain embodiments, the controller 160 may also determine resistance values for the first, third, and fourth transistors Q1, Q3, and Q4, based on the first, third, and fourth currents I1, I3, and I4. For example, when the first current I1 or the third current I3 exceeds a first reference value, the controller 160 may limit the first current I1 or the third current I3 to the first reference value or less by changing the resistance value of the first transistor Q1 or the third transistor Q3, thereby limiting the first battery current IBAT1. Alternately or additionally, when the fourth current I4 exceeds a second reference value, the controller 160 may limit the fourth current I4 to the second reference value or less by changing the resistance value of the fourth transistor Q4, thereby limiting the second battery current IBAT2. In an embodiment, the first reference value may be the same as the second reference value. Here, the first reference value may be different from the second reference value. For example, the first and second reference values may be determined based on the respective capacities and/or performance characteristics of the first and second batteries BAT1 and BAT2.

In certain embodiment, the controller 160 may generate the first, second, third and fourth control signals SC1, SC2, SC3, and SC4, based on the first, third, and fourth currents I1, I3, and I4. For example, the controller 160 may compare the first current I1 with the first reference value and, when the first current I1 exceeds the first reference value, the controller 160 may generate the first control signal SC1 to adjust the resistance value of the first transistor Q1, whereby the first battery current IBAT1 may be controlled to be equal to or less than the first reference value. Alternately or additionally, the controller 160 may generate the first control signal SC1 such that the first transistor Q1 operates in a triode region.

Figure 7:
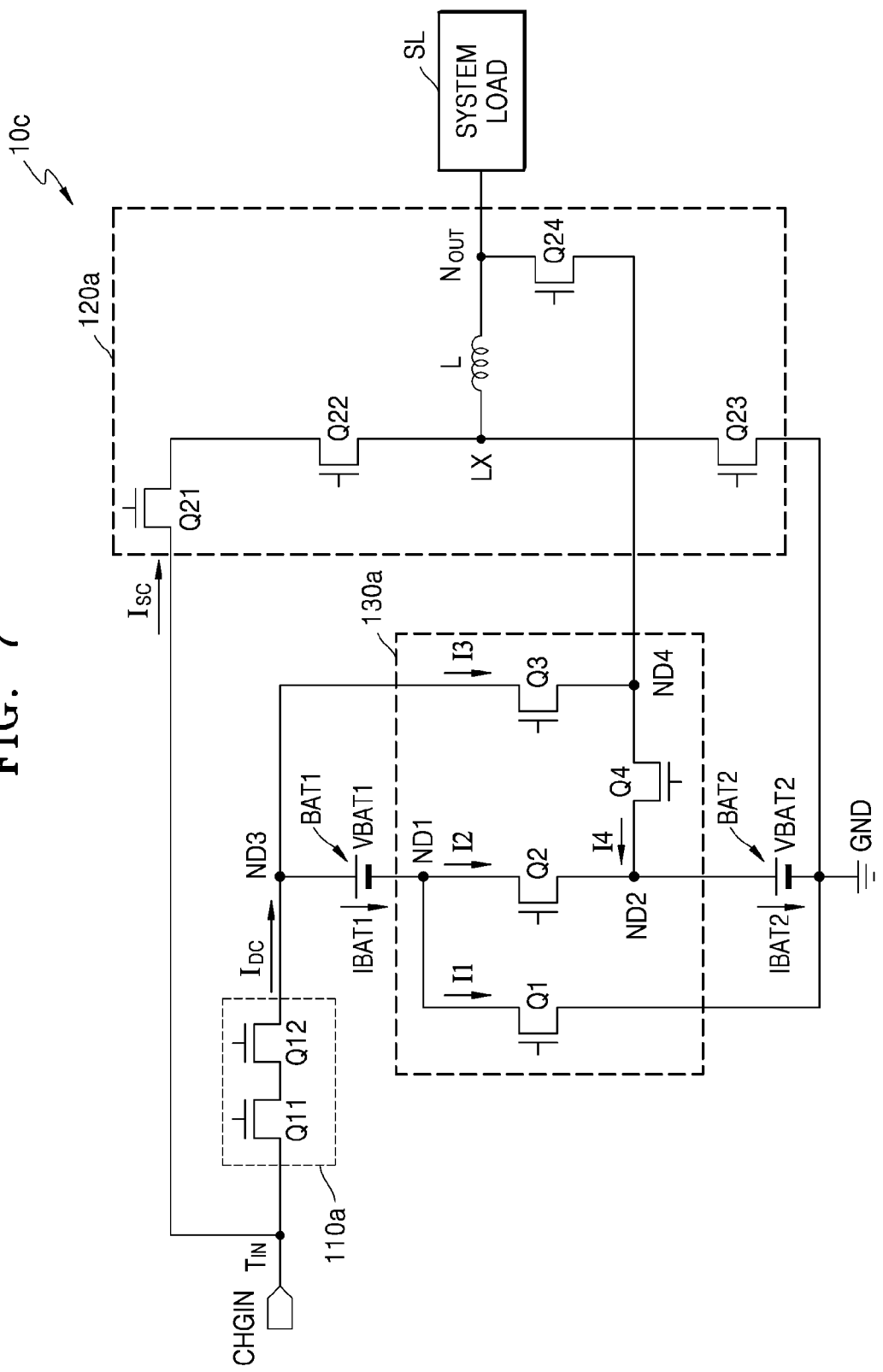
FIG. 7 is a circuit diagram illustrating an electronic device according to embodiments of the inventive concept.

FIG. 7 is a circuit diagram illustrating an electronic device 10c according to embodiments of the inventive concept.

Referring to FIG. 7, the electronic device 10c is substantially similar to the electronic device 10a of FIG. 5, except that the direct charger 110a is further illustrated as including transistors Q11 and Q12, and the switching charger 120a is further illustrated as including transistors Q21, Q22, Q23 and Q24 (hereafter collectively, Q21 to Q24), as well as an inductor L.

In this regard, the electronic device 10c is presented as an implementation example, although those skilled in the art will understand that the direct charger 110a may include three or more transistors, or alternately may include only one of the transistors Q11 and Q12.

However, as illustrated in FIG. 7, the transistors Q11 and Q12 may be connected to in series, such that one end of the transistor Q11 is connected to the input voltage terminal $T_{IN}$, and the other end of the transistor Q11 is connected to the transistor Q12. One end of the transistor Q12 is connected to the transistor Q11, and the other end of the transistor Q12 is connected to the third node ND3 that is connected to the positive terminal of the first battery BAT1. In this manner, the transistors Q11 and Q12 may provide the input voltage CHGIN to a battery device including the first and second batteries BAT1 and BAT2.

Although the switching charger 120a may include transistors Q21 to Q24 and an inductor L, the inventive concept is not limited thereto, and the number of transistors or inductors included in the switching charger 120a may vary with design. The transistors Q21 and Q22 may be connected in series between the input voltage terminal $T_{IN}$ and a switching node LX and may provide the input voltage CHGIN to the switching node LX. For example, the transistor Q21 may be turned ON in a charging mode, and thus, the transistor Q21 may be referred to as a "charging transistor". The transistor Q23 may be connected between the switching node LX and the ground terminal GND and may provide a ground voltage to the switching node LX. The inductor L may be connected between the switching node LX and the output node $N_{OUT}$. The transistors Q22 and Q23 may be alternately turned ON. The transistor Q24 may be connected between the output node $N_{OUT}$ and a fourth node ND4. The transistor Q24 may be provided with a voltage from the inductor L through the output node $N_{OUT}$ and may provide the voltage to the first and second batteries BAT1 and BAT2 through the fourth node ND4 and the third and fourth transistors Q3 and Q4 of the battery switch 130a. However, the inventive concept is not limited thereto, and in some embodiments, the switching charger 120a may omit the transistor Q24 directly connect the inductor L to the fourth node ND4.

The transistors Q11 and Q12 included in the direct charger 110a and the transistors Q21 to Q24 included in the switching charger 120a may be driven by a controller. In certain embodiments, the controller may correspond to the controller 160 of FIG. 6 and may be implemented within the charger IC. Alternately, the controller may be implemented within a control block 180 included in an interface-power management integrated circuit (IF-PMIC) (See also, e.g., element 300 of FIG. 23 and elements 400 and/or 500 of FIG. 24).

Figure 8:
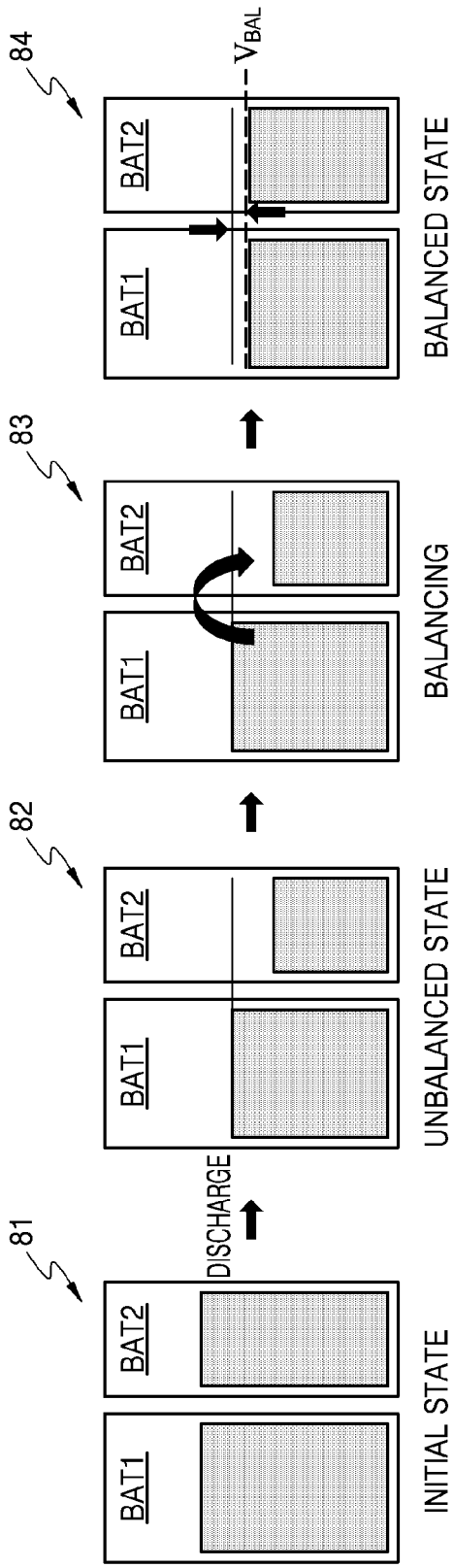
FIG. 8 is a conceptual diagram illustrating a balancing operation according to embodiments of the inventive concept.

FIG. 8 is a conceptual diagram illustrating an example of a balancing operation for the first and second batteries BAT1 and BAT2 of certain embodiments of the inventive concept.

Referring collectively to FIGS. 5, 6, 7 and 8, in an initial state 81, the first and second batteries BAT1 and BAT2 may be charged to a same voltage level. Thereafter, for example, in a discharging mode of the electronic device 10a, the second battery BAT2 may provide the system current $I_{SYS}$ to the system load SL, whereby the second both-end voltage VBAT2 of the second battery BAT2 may more quickly decrease than the first both-end voltage VBAT1 of the first battery BAT1, such that the first and second batteries BAT1 and BAT2 reach an unbalanced state 82.

In a balancing operation period 83, a balancing operation may be performed to transfer energy from the first battery BAT1 to the second battery BAT2 using the battery switch 130a. That is, the energy of the first battery BAT1 may be transferred to the second battery BAT2 by selectively turning ON the first, third, and fourth transistors Q1, Q3, and Q4. Accordingly, the first and second batteries BAT1 and BAT2 may be returned to a balanced state 84 (e.g., a balance voltage $V_{BAL}$).

Figure 9:
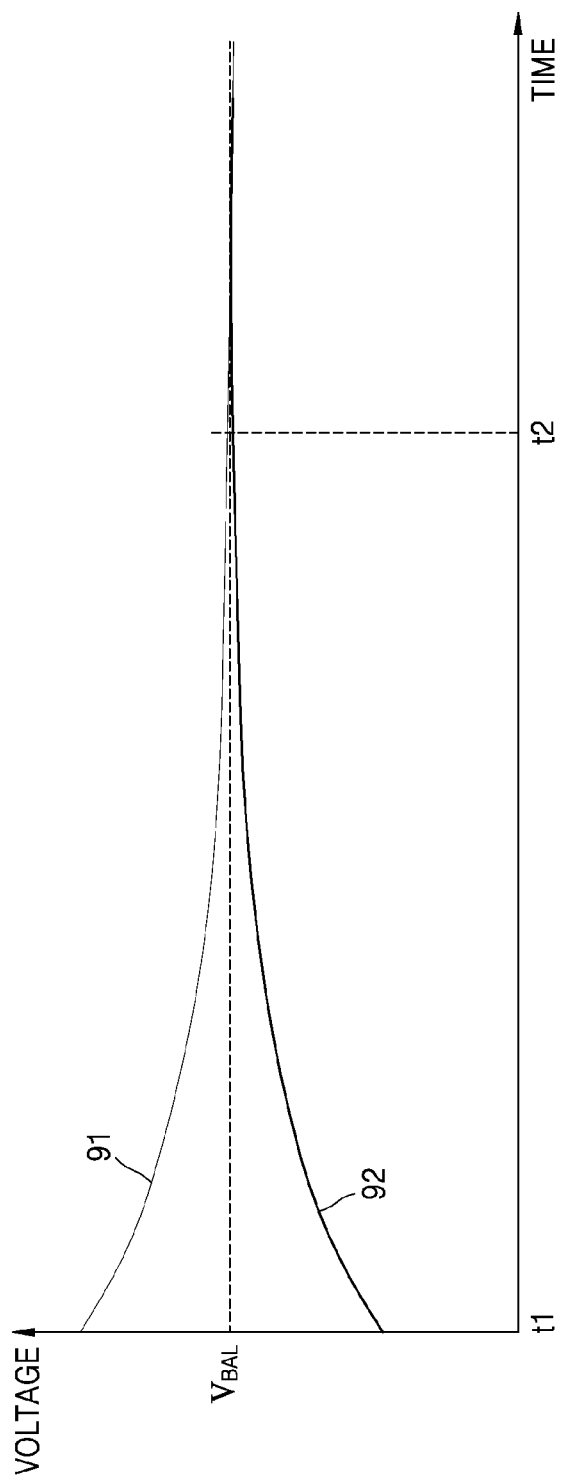
FIG. 9 is a graph depicting voltages of first and second batteries over time according to embodiments of the inventive concept.

FIG. 9 is a graph further illustrating the development of the balance voltage $V_{BAL}$ over time for the first and second batteries BAT1 and BAT2 according to embodiments of the inventive concept.

Referring to FIGS. 5 and 9, time is indicated by the horizontal axis, and battery voltage is indicated by the vertical axis. The first both-end voltage VBAT1 of the first battery BAT1 may have a level that decreases with time (e.g., a first curve 91). Likewise, the second both-end voltage VBAT2 of the second battery BAT2 may have a voltage level that decreases with time (e.g., a second curve 92). However, at a first time t1, the first both-end voltage VBAT1 of the first battery BAT1 is greater than the second both-end voltage VBAT2 of the second battery BAT2. Here, the first time t1 may correspond to the unbalanced state 82 of FIG. 8. At a later, second time t2, the first both-end voltage VBAT1 of the first battery BAT1 and the second both-end voltage VBAT2 of the second battery BAT2 may become equal to each other at the balance voltage $V_{BAL}$. Here, the second time point t2 may correspond to the balanced state 84 of FIG. 8. A time period between the first time point t1 and the second time point t2 may correspond to a balancing operation period 83.

According to certain embodiments of the inventive concept, based on a difference between the first both-end voltage VBAT1 of the first battery BAT1 and the second both-end voltage VBAT2 of the second battery BAT2, the first and second batteries BAT1 and BAT2 may be selectively connected in series or in parallel using the battery switch 130a in order to achieve a balancing between the first and second both-end voltages VBAT1 and VBAT2 of the first and second batteries BAT1 and BAT2. Therefore, because the electronic device 10a need not include additional, voltage-balancing circuitry, the overall area of a PCB within an electronic device according to embodiments of the inventive concept may be reduced.

Figure 10:
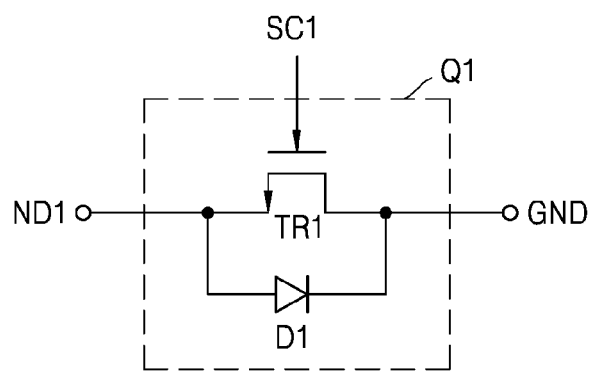
FIG. 10 is a circuit diagram illustrating in one example the first transistor Q1 of FIG. 5.

FIG. 10 is a circuit diagram further illustrating in one example the first transistor Q1 of FIG. 5.

Referring to FIG. 10, the first transistor Q1 may include a transistor TR1 and a diode D1. The transistor TR1 may be an N-type Metal Oxide Semiconductor (NMOS) transistor driven by a control signal SC1. For example, the transistor TR1 may include a source connected to the first node ND1, a gate to which the control signal SC1 is applied, and a drain connected to the ground terminal GND. However, the inventive concept is not limited thereto, and the transistor TR1 may be implemented by a P-type MOS (PMOS) transistor. The diode D1 may be a parasitic diode of the transistor TR1 and may prevent unintended leakage current from flowing in a direction toward the first node ND1 even when the first transistor Q1 is turned OFF. The second to fourth transistors Q2 to Q4 shown in FIG. 5 may be implemented similarly to the first transistor Q1 shown in FIG. 10. In some embodiments, the first transistor Q1 may include a body switch instead of the diode D1. The first transistor Q1 may reduce leakage current by using a body switching technique.

Figure 11:
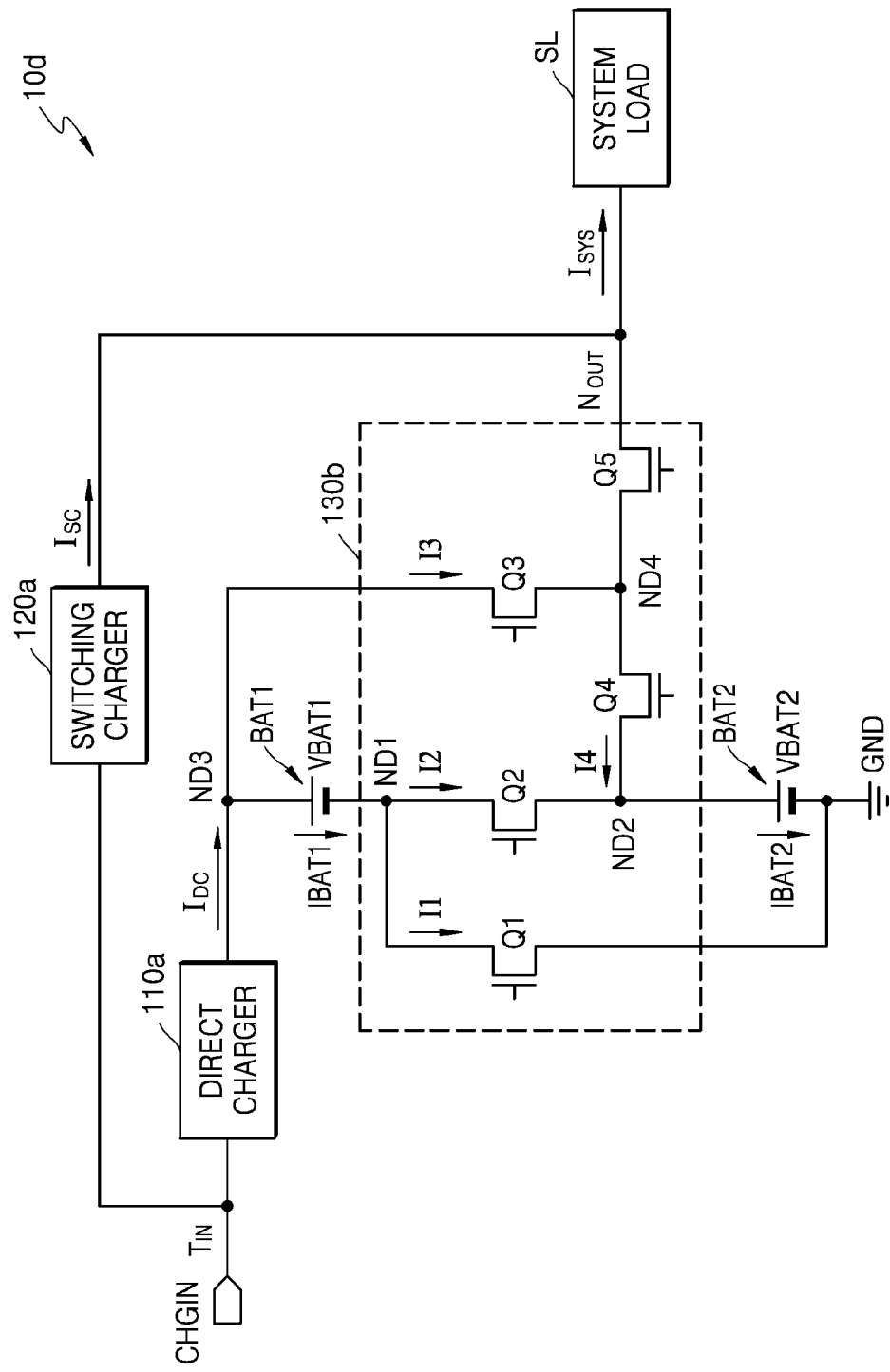
FIG. 11 is a block diagram illustrating an electronic device according to embodiments of the inventive concept.

FIG. 11 is a block diagram illustrating an electronic device 10d according to embodiments of the inventive concept.

Referring to FIG. 11, the electronic device 10d may be understood as a modified version of the electronic device 10a of FIG. 5, wherein a battery switch 130b further includes a fifth transistor Q5, as compared with the battery switch 130a of FIG. 5. The fifth transistor Q5 may be arranged between the fourth node ND4 and the output node $N_{OUT}$. The fifth transistor Q5 may be turned ON in a discharging mode, and specifically, the fifth transistor Q5 may be turned ON when the first or second battery BAT1 or BAT2 provides the system current $I_{SYS}$ to the system load SL. In addition, the fifth transistor Q5 may also be turned ON in a charging mode, and specifically, the fifth transistor Q5 may be turned ON when the first or second battery BAT1 or BAT2 is charged by using a charging current $I_{SC}$ generated by the switching charger 120a.

Figure 12:
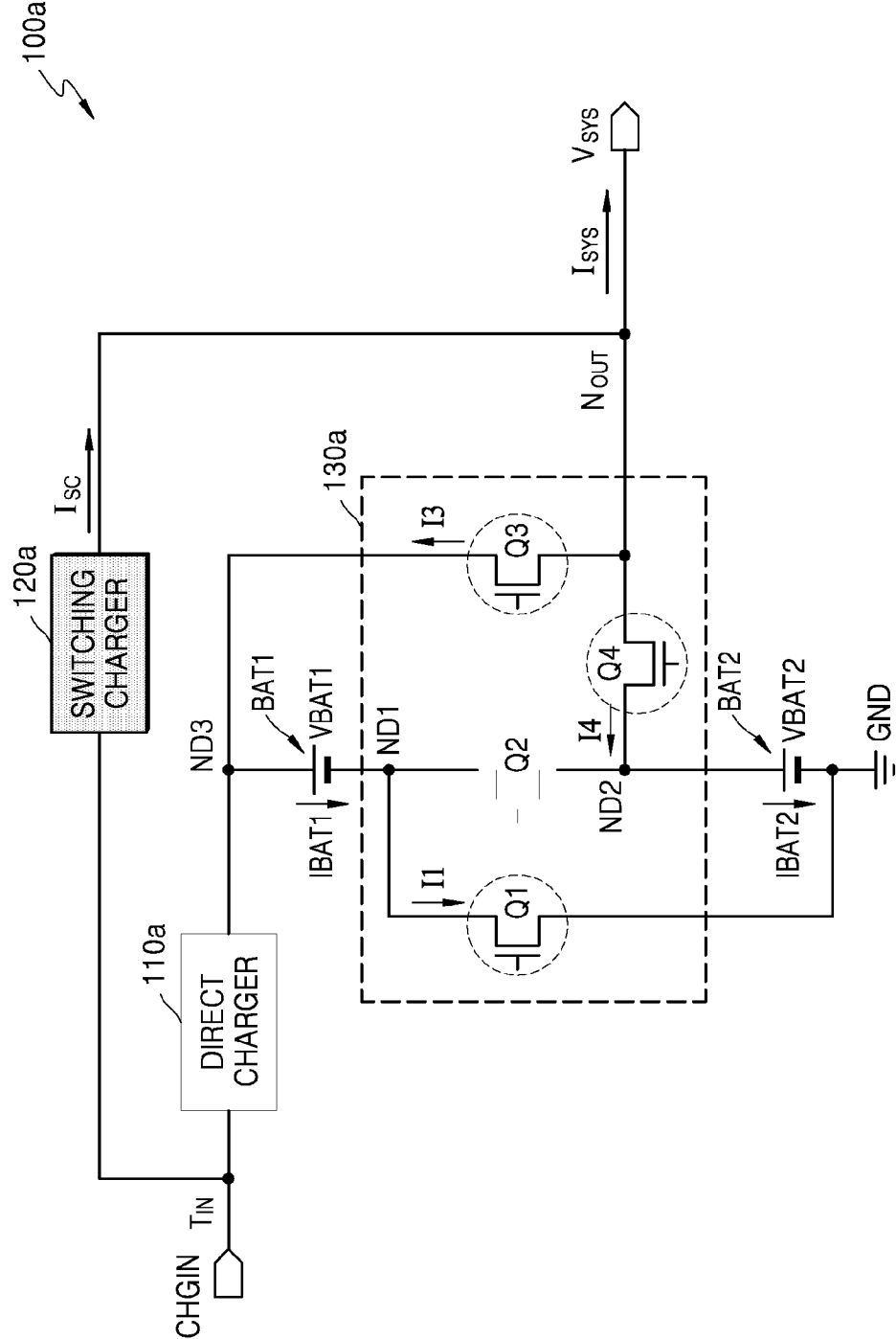
FIG. 12 is a block diagram illustrating a first charging mode for charger integrated circuits according to embodiments of the inventive concept.

FIG. 12 is a block diagram illustrating a first charging mode for the charger IC 100a of FIG. 5 according to embodiments of the inventive concept.

Referring to FIG. 12, when the input voltage CHGIN received from the input voltage terminal $T_{IN}$ of the charger IC 100a cannot be precisely controlled, the input voltage CHGIN may have a fixed voltage level. For example, when a low-voltage travel adapter TA is connected to the input voltage terminal $T_{IN}$, a charging mode may be determined as corresponding to the first charging mode. In the first charging mode, the switching charger 120a is activated, the direct charger 110a is inactivated, and the first and second batteries BAT1 and BAT2 are connected in parallel. Accordingly, the switching charger 120a may generate the second charging current $I_{SC}$ from the input voltage CHGIN, and the first and second batteries BAT1 and BAT2 may be charged by using the second charging current $I_{SC}$. Here, the sum of the first battery current IBAT1 applied to the first battery BAT1 and the second battery current IBAT2 applied to the second battery BAT2 may correspond to the second charging current $I_{SC}$. The charger IC 100a may provide the system current $I_{SYS}$, and in this case, the sum of the first battery current IBAT1, the second battery current IBAT2, and the system current $I_{SYS}$ may correspond to the second charging current $I_{SC}$.

In addition, in the first charging mode, the first, third, and fourth transistors Q1, Q3, and Q4 may be turned ON, the second transistor Q2 may be turned OFF, and thus, the first and second batteries BAT1 and BAT2 may be connected in parallel. Here, the first current I1 flowing through the first transistor Q1 and the third current I3 flowing through the third transistor Q3 would be the same as the first battery current IBAT1, and the fourth current I4 flowing through the fourth transistor Q4 would be the same as the second battery current IBAT2. Accordingly, one of the first and third transistors Q1 and Q3 may have a current control function to control the first battery current IBAT1, and the fourth transistor Q4 may have a current control function to control the second battery current IBAT2.

In an embodiment, when the first current I1 exceeds a first reference value, the resistance value of the first transistor Q1 may be increased, thereby limiting the first battery current IBAT1 to the first reference value or less. In an embodiment, when the third current I3 exceeds the first reference value, the resistance value of the third transistor Q3 may be increased, thereby limiting the first battery current IBAT1 to the first reference value or less. In an embodiment, when the fourth current I4 exceeds a second reference value, the resistance value of the fourth transistor Q4 may be increased, thereby limiting the second battery current IBAT2 to the second reference value or less.

Figure 13:
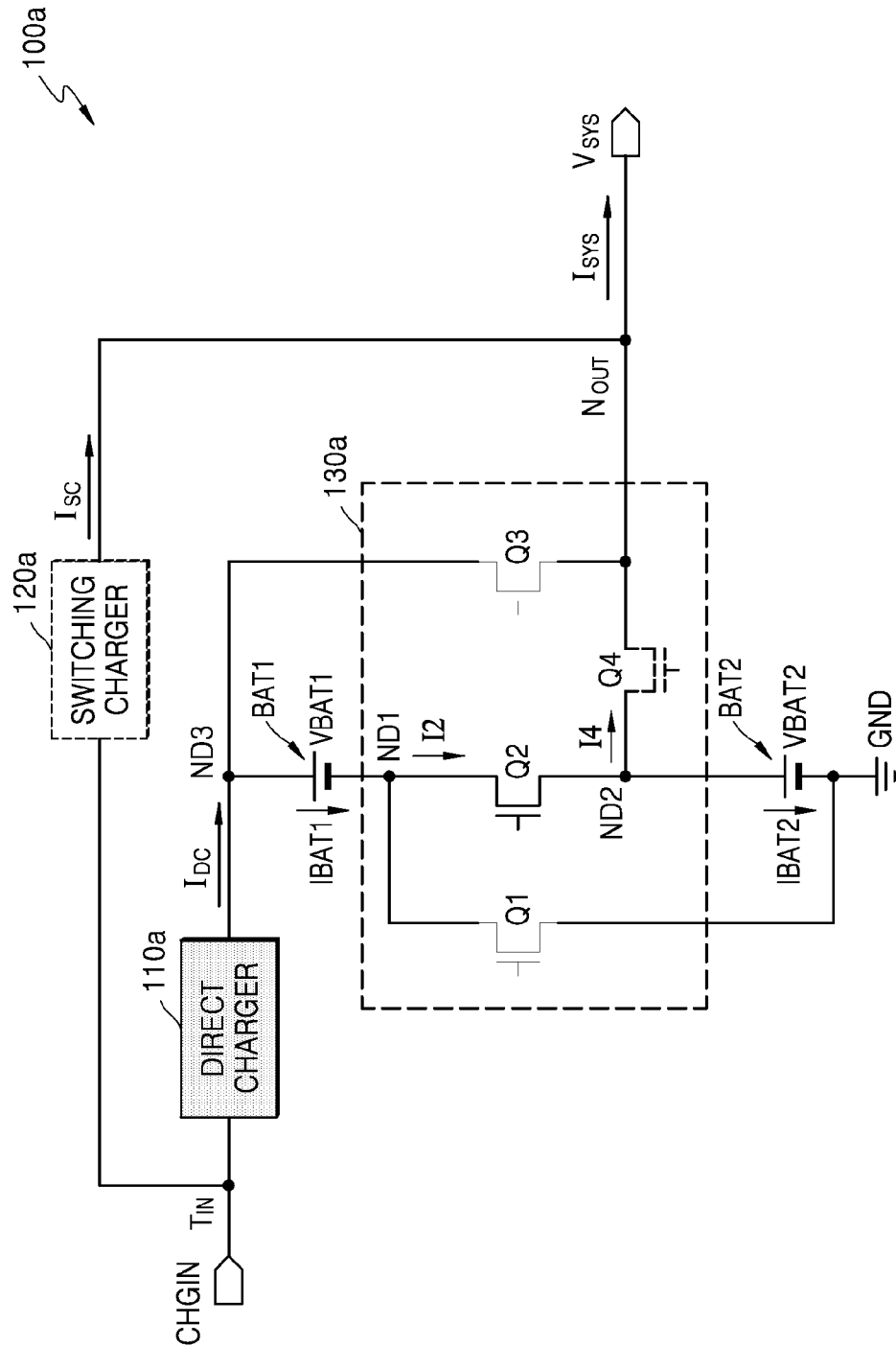
FIGS. 13, 14 and 15 are respective block diagram illustrating various second charging modes for charger integrated circuits according to embodiments of the inventive concept.

FIG. 13 is a block diagram illustrating one example of a second charging mode for the charger IC 100a of FIG. 5 according to embodiments of the inventive concept.

Referring to FIG. 13, when the input voltage CHGIN received from the input voltage terminal $T_{IN}$ of the charger IC 100a can be precisely controlled, the input voltage CHGIN may have a variable voltage level. For example, when a travel adapter TA supporting USB PD is connected to the input voltage terminal $T_{IN}$, the charging mode may be determined as the second charging mode. In the second charging mode, the direct charger 110a is activated and the first and second batteries BAT1 and BAT2 are connected in series. The direct charger 110a may generate the first charging current $I_{DC}$ from the input voltage CHGIN, and the first and second batteries BAT1 and BAT2 may be charged by using the first charging current $I_{DC}$. In certain embodiments, in the second charging mode, the switching charger 120a may be activated to generate the second charging current $I_{SC}$ from the input voltage CHGIN, and the charger IC 100a may provide the system current $I_{SYS}$ from the second charging current $I_{SC}$. In other embodiments, in the second charging mode, the switching charger 120a may be inactivated.

In addition, in the second charging mode, the first and third transistors Q1 and Q3 may be turned OFF, the second transistor Q2 may be turned ON, and thus, the first and second batteries BAT1 and BAT2 may be connected in series. Here, the first charging current $I_{DC}$ generated by the direct charger 110a may be the same as the first battery current IBAT1, the second current I2 flowing through the second transistor Q2, and the second battery current IBAT2. The fourth transistor Q4 may be turned ON or OFF according to whether or not the second battery BAT2 provides the system current $I_{SYS}$. When the second battery BAT2 provides the system current $I_{SYS}$, the fourth transistor Q4 may be turned ON, and when the second battery BAT2 does not provide the system current $I_{SYS}$, the fourth transistor Q4 may be turned OFF.

Figure 14:
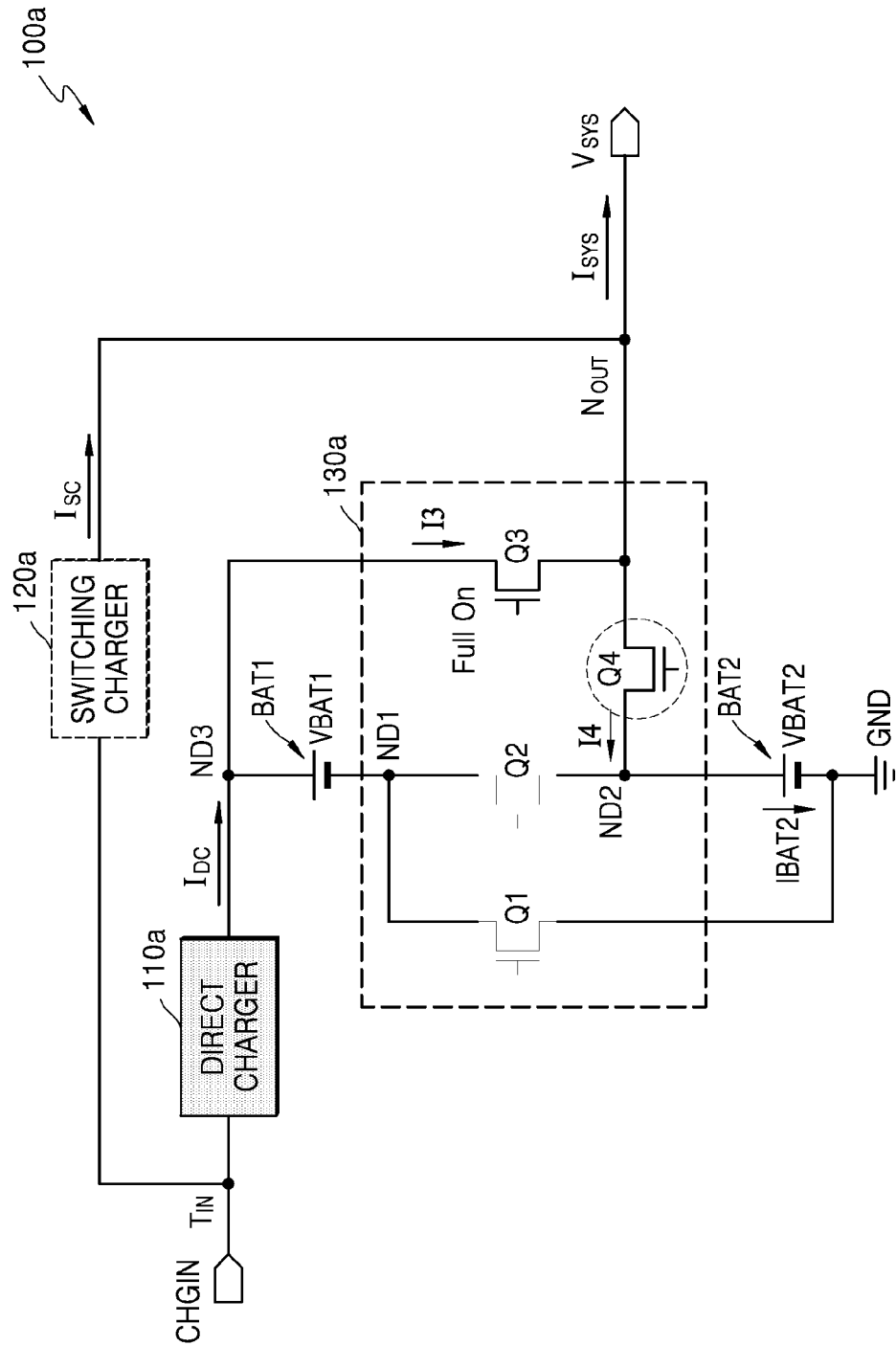

FIG. 14 is a block diagram illustrating another example of the second charging mode for the charger IC 100a of FIG. 5 according to embodiments of the inventive concept.

Referring to FIG. 14, when the first and second batteries BAT1 and BAT2 are charged in the second charging mode, the first battery BAT1 may first become fully charged. Here, the first and second transistors Q1 and Q2 may be turned OFF, and the first battery current IBAT1 may no longer flow to the first battery BAT1. The third and fourth transistors Q3 and Q4 may be turned ON, and the first charging current $I_{DC}$ generated by the direct charger 110a may be provided to the second battery BAT2 through the third and fourth transistors Q3 and Q4. In an embodiment, when the fourth current I4 exceeds a reference value, the resistance value of the fourth transistor Q4 may be increased, thereby limiting the second battery current IBAT2 to the reference value or less.

Figure 15:
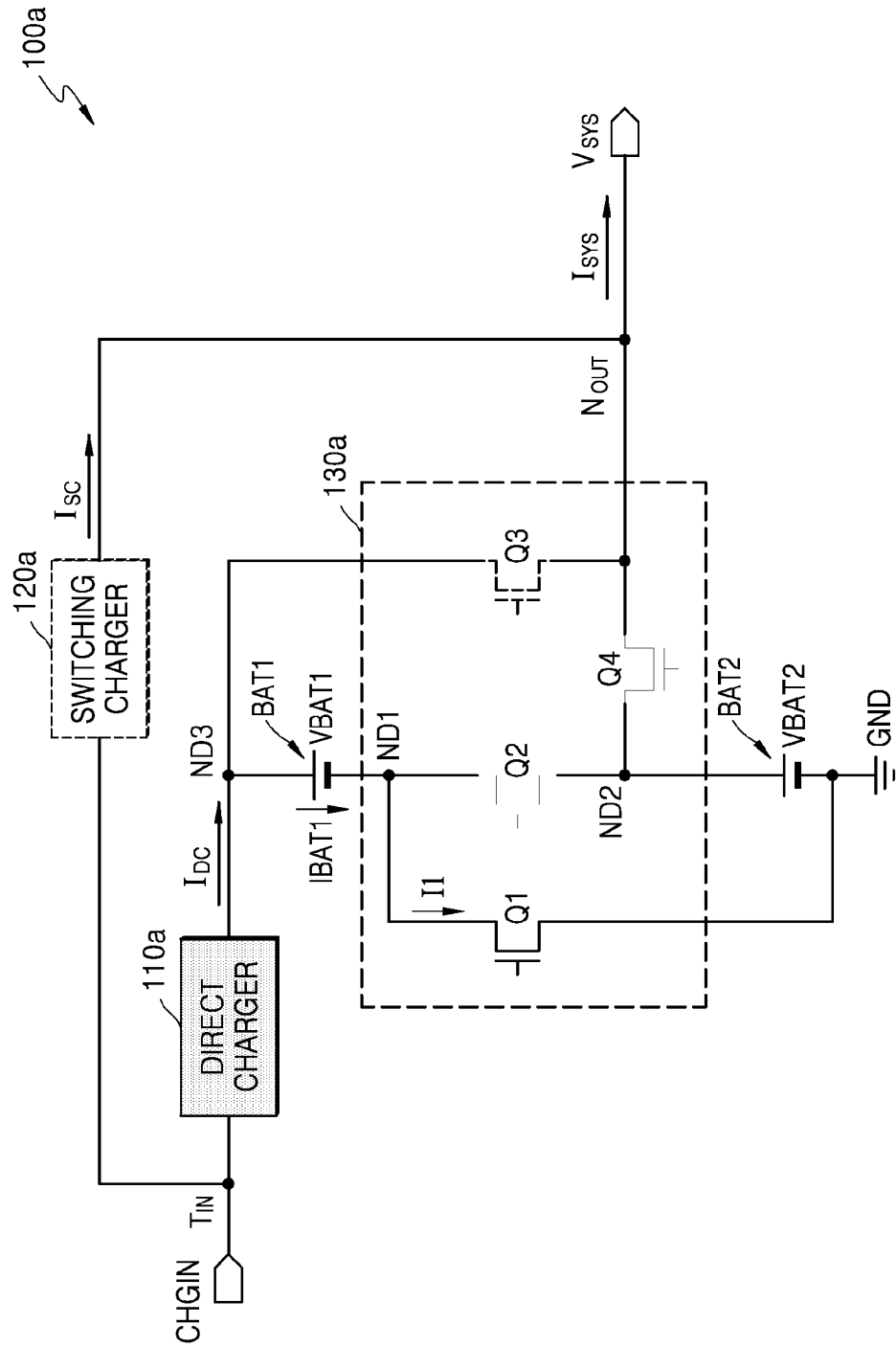

FIG. 15 is a block diagram illustrating still another example of the second charging mode for the charger IC 100a of FIG. 5 according to embodiments of the inventive concept.

Referring to FIG. 15, when the first and second batteries BAT1 and BAT2 are charged in the second charging mode, the second battery BAT2 may first become fully charged. Here, the second and fourth transistors Q2 and Q4 may be turned OFF, and the second battery current IBAT2 may no longer flow to the second battery BAT2. The first transistor Q1 may be turned ON, and the first charging current $I_{DC}$ generated by the direct charger 110a may be provided to the first battery BAT1. The third transistor Q3 may be turned ON or OFF according to whether or not the direct charger 110a provides the system current $I_{SYS}$. When the direct charger 110a provides the system current $I_{SYS}$, the third transistor Q3 may be turned ON, and when the direct charger 110a does not provide the system current $I_{SYS}$, the third transistor Q3 may be turned OFF.

Figure 16:
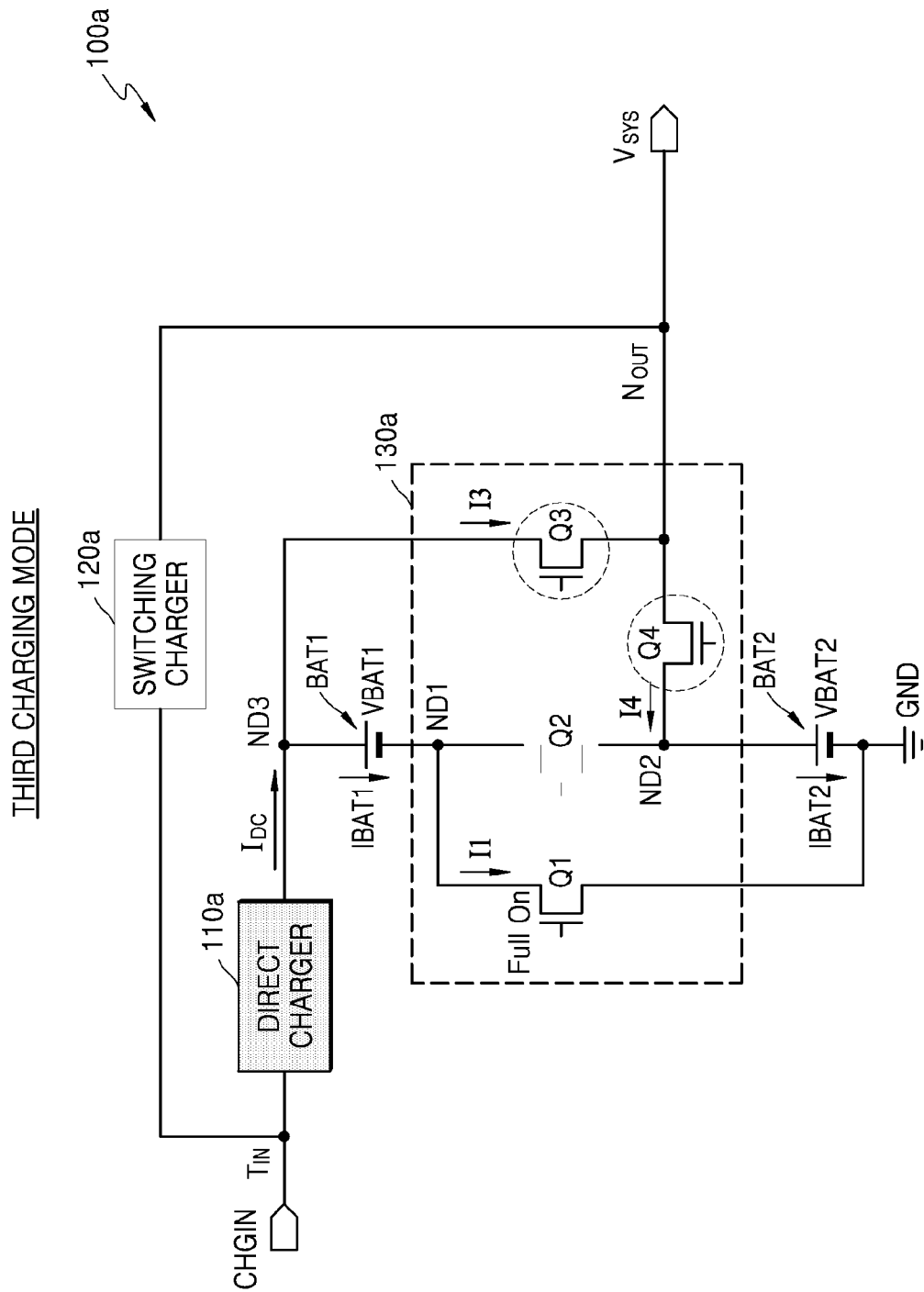
FIGS. 16 and 17 are respective block diagrams illustrating various third charging modes for charger integrated circuits according to embodiments of the inventive concept.

FIG. 16 is a block diagram illustrating in one example a third charging mode for the charger IC 100a of FIG. 5 according to embodiments of the inventive concept.

Referring to FIG. 16, when the input voltage CHGIN received from the input voltage terminal $T_{IN}$ of the charger IC 100a can be precisely controlled, the input voltage CHGIN may have a variable voltage level. For example, when a travel adapter TA supporting USB PD is connected to the input voltage terminal $T_{IN}$ and a difference between the first both-end voltage VBAT1 of the first battery BAT1 and the second both-end voltage VBAT2 of the second battery BAT2 is greater than a reference value, the charging mode may be determined as the third charging mode. In the third charging mode, the direct charger 110a is activated, and the first and second batteries BAT1 and BAT2 are connected in parallel. Here, the switching charger 120a may be inactivated.

In the third charging mode, the second transistor Q2 may be turned OFF, and the first, third, and fourth transistors Q1, Q3, and Q4 may be turned ON. In an embodiment, when the first both-end voltage VBAT1 is greater than the second both-end voltage VBAT2, the fourth transistor Q4 may have a current control function for controlling the second battery current IBAT2. That is, when the fourth current I4 exceeds the second reference value, the resistance value of the fourth transistor Q4 may be increased, thereby limiting the second battery current IBAT2 to a reference value or less. Here, the first and third transistors Q1 and Q3 may be fully turned ON.

In an embodiment, when the first both-end voltage VBAT1 is greater than the second both-end voltage VBAT2, the direct charger 110a may limit the first charging current $I_{DC}$ such that the first battery current IBAT1 applied to the first battery BAT1 is less than the second battery current IBAT2 applied to the second battery BAT2. Accordingly, the difference between the first both-end voltage VBAT1 of the first battery BAT1 and the second both-end voltage VBAT2 of the second battery BAT2 may be reduced.

Figure 17:
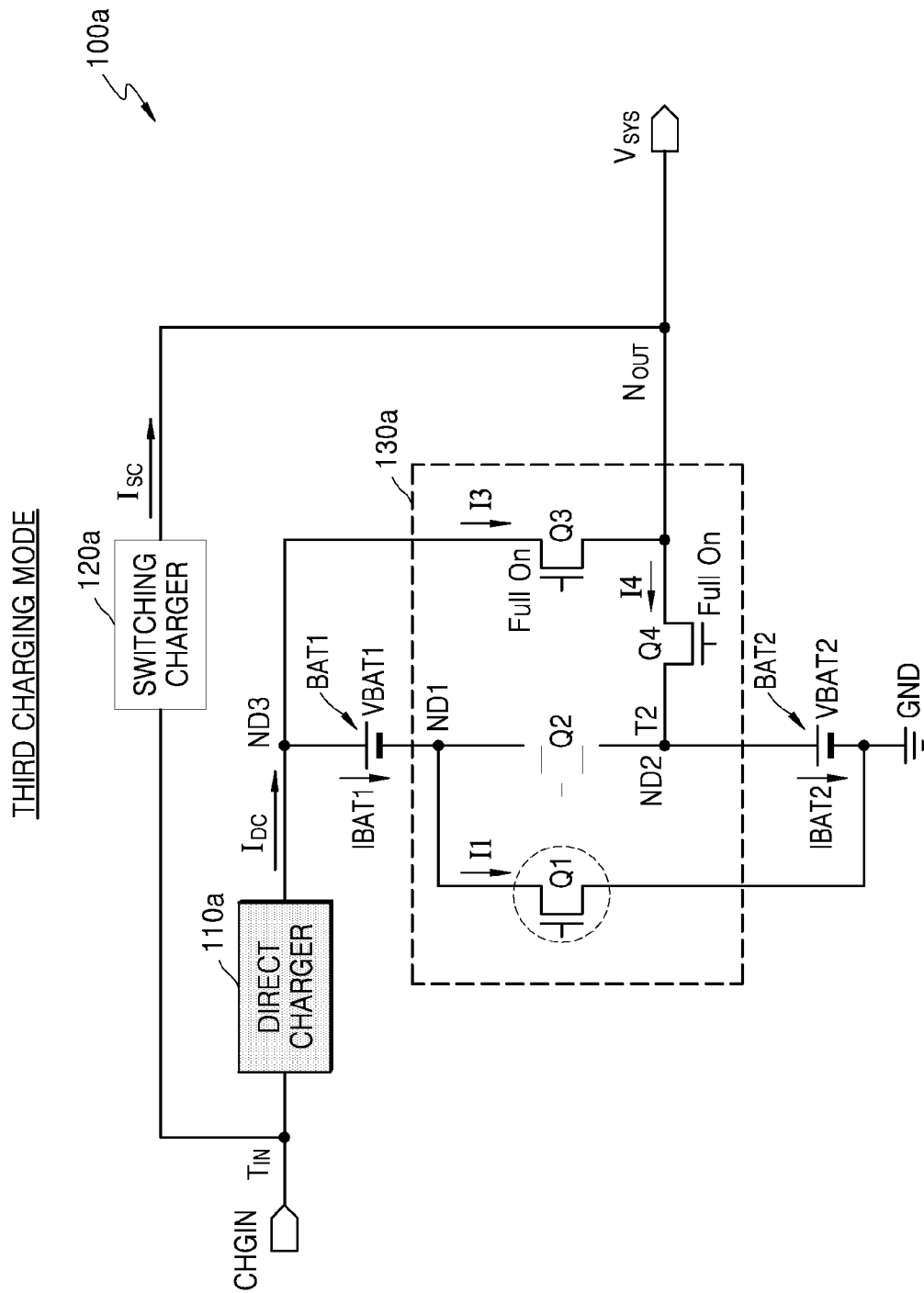

FIG. 17 is a block diagram illustrating in another example the third charging mode of the charger IC 100a of FIG. 5 according to embodiments of the inventive concept.

Here, the example of FIG. 17 is a modified version of the example described in relation to FIG. 16. Thus, in the third charging mode, the second transistor Q2 may be turned OFF, and the first, third, and fourth transistors Q1, Q3, and Q4 may be turned ON. Here, when the second both-end voltage VBAT2 is greater than the first both-end voltage VBAT1, the first transistor Q1 may have a current control function for controlling the first battery current IBAT1. Specifically, when the first current I1 exceeds the first reference value, the resistance value of the first transistor Q1 may be increased, thereby limiting the first battery current IBAT1 to the first reference value or less. Here, the third and fourth transistors Q3 and Q4 may be fully turned ON.

In an embodiment, when the first both-end voltage VBAT1 is less than the second both-end voltage VBAT2, the direct charger 110a may limit the first charging current $I_{DC}$ such that the first battery current IBAT1 applied to the first battery BAT1 is greater than the second battery current IBAT2 applied to the second battery BAT2. Accordingly, the difference between the first both-end voltage VBAT1 of the first battery BAT1 and the second both-end voltage VBAT2 of the second battery BAT2 may be reduced.

Figure 18:
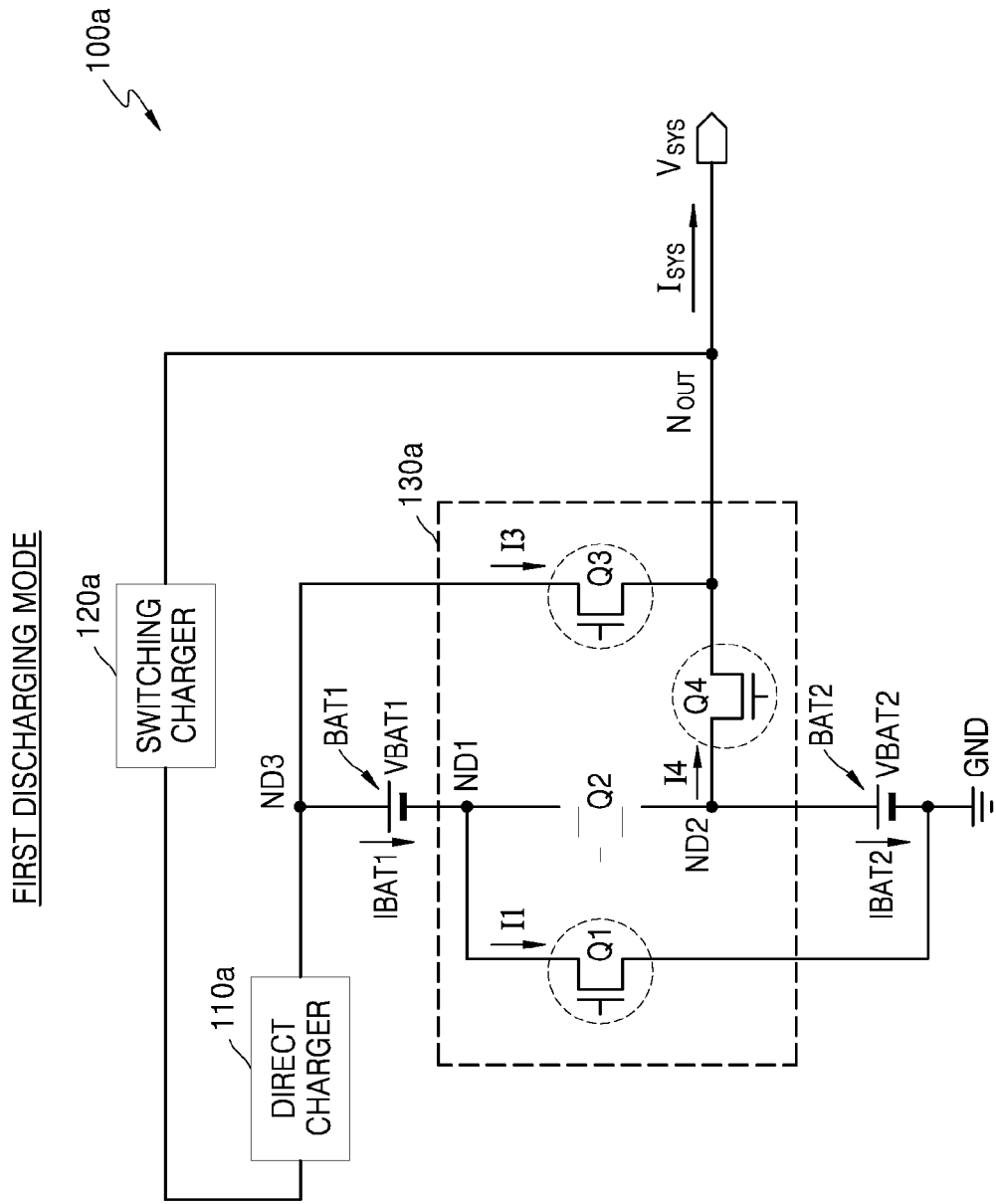
FIG. 18 is a block diagram illustrating a first discharging mode for charger integrated circuits according to embodiments of the inventive concept.

FIG. 18 is a block diagram illustrating in one example a first discharging mode for the charger IC 100a of FIG. 5 according to embodiments of the inventive concept.

Referring to FIG. 18, it is assumed that a travel adapter TA is not connected to the charger IC 100a, so the operation mode of the charger IC 100a may be determined as the first discharging mode. In the first discharging mode, the charger IC 100a does not charge the first and second batteries BAT1 and BAT2, and instead, at least one of the first and second batteries BAT1 and BAT2 may provide the system current $I_{SYS}$ or a system voltage $V_{SYS}$. In the first discharging mode, both the direct charger 110a and the switching charger 120a may be inactivated. In addition, in the first discharging mode, the second transistor Q2 may be turned OFF, the first, third, and fourth transistors Q1, Q3, and Q4 may be turned ON, and thus, the first and second batteries BAT1 and BAT2 may be connected in parallel.

Here, the first transistor Q1 is fully turned ON when the first battery BAT1 is discharged, and the fourth transistor Q4 is fully turned ON when the second battery BAT2 is discharged. In certain embodiments, when the first both-end voltage VBAT1 of the first battery BAT1 is less than the second both-end voltage VBAT2 of the second battery BAT2, the first battery BAT1 may be charged by the second battery BAT2, such that the first or third transistor Q1 or Q3 provides a current limiting function in relation to the first battery current IBAT1. Alternately, when the first both-end voltage VBAT1 of the first battery BAT1 is greater than the second both-end voltage VBAT2 of the second battery BAT2, the second battery BAT2 may be charged by the first battery BAT1, such that the fourth transistor Q4 provides a current limiting function in relation to the second battery current IBAT2.

Figure 19:
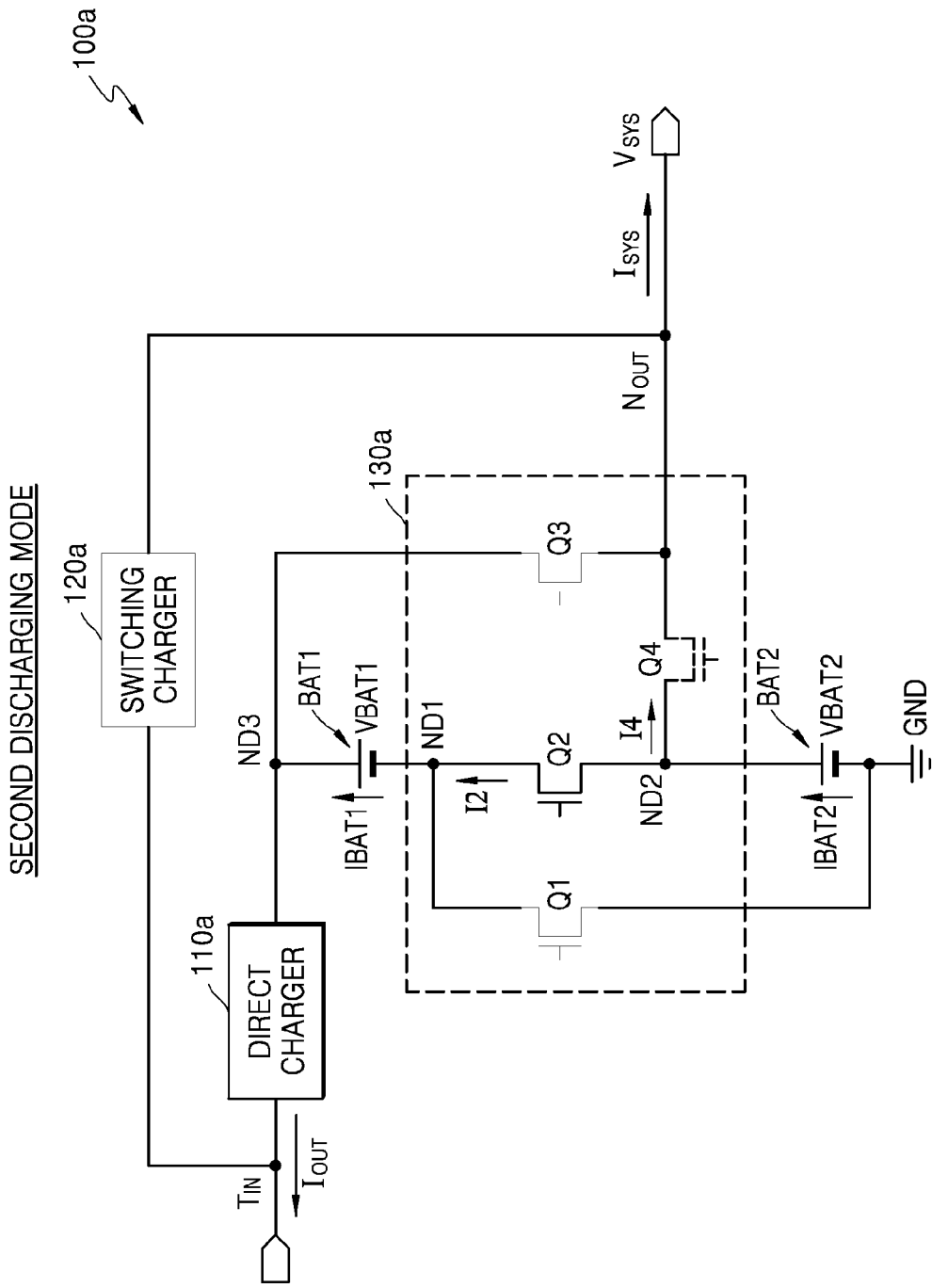
FIGS. 19 and 20 are respective block diagrams illustrating a second discharging mode for charger integrated circuits according to embodiments of the inventive concept.

FIG. 19 is a block diagram illustrating in one example a second discharging mode for the charger IC 100a of FIG. 5 according to embodiments of the inventive concept.

Referring to FIG. 19, it is assumed that the input voltage terminal $T_{IN}$ of a first electronic device (e.g., the charger IC 100a of FIG. 5) is connected to second electronic device instead of being connected to a travel adapter. The connection between the first and second electronic devices may be made wirelessly or using a hard-wired connection (e.g., a phone-to-phone connection). In either event, the operation mode for the first electronic device (e.g., the charger IC 100a) may be determined as the second discharging mode. In the second discharging mode, at least one of the first and second batteries BAT1 and BAT2 may provide the system current $I_{SYS}$ or the system voltage $V_{SYS}$, as well as providing an output current $I_{OUT}$ for charging the second electronic device through the input voltage terminal $T_{IN}$.

In the second discharging mode, the switching charger 120a may be inactivated, and the direct charger 110a may be used as a current path. Here, the second transistor Q2 may be turned ON, and the first and third transistors Q1 and Q3 may be turned OFF, whereby the first and second batteries BAT1 and BAT2 may be connected in series. Accordingly, the first and second batteries BAT1 and BAT2 may provide the output current $I_{OUT}$. The fourth transistor Q4 may be turned ON to provide the system voltage $V_{SYS}$. For example, the fourth transistor Q4 may be turned ON to provide the system current $I_{SYS}$ using the second battery BAT2.

Figure 20:
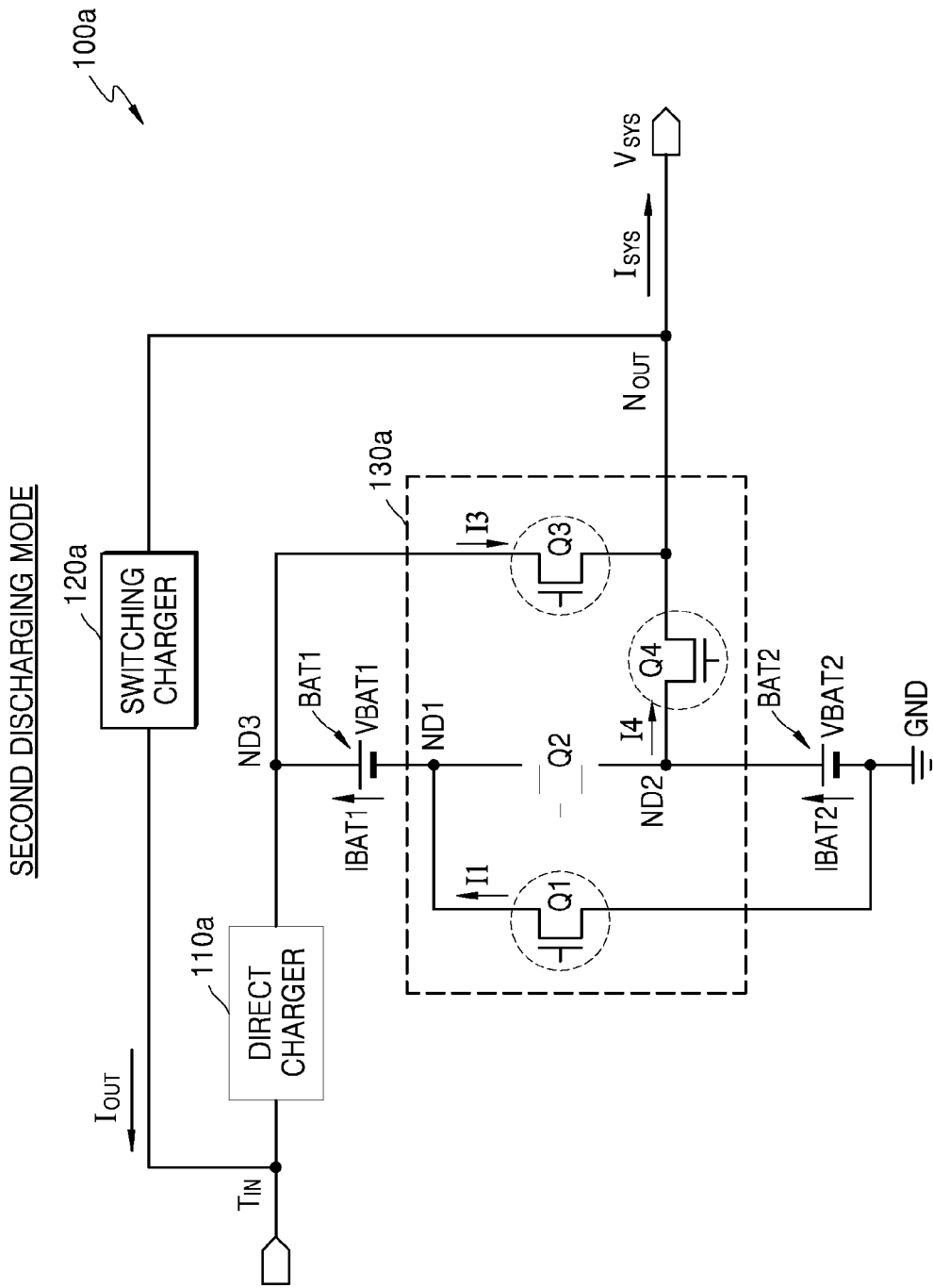

FIG. 20 is a block diagram illustrating in another example the second discharging mode for the charger IC 100a of FIG. 5 according to an embodiment of the inventive concept.

Referring to FIG. 20, it is again assumed that the input voltage terminal $T_{IN}$ of the first charger IC 100a is connected (wirelessly or wired) to a second electronic device, such that the operation mode of the charger IC 100a is determined as the second discharging mode. In the second discharging mode, at least one of the first and second batteries BAT1 and BAT2 may provide the system current $I_{SYS}$ or the system voltage $V_{SYS}$, as well as providing the output current $I_{OUT}$ to charge the second electronic device through the input voltage terminal $T_{IN}$.

In certain embodiments, in the second discharging mode, the direct charger 110a may be inactivated, and the switching charger 120a may be activated and used as a boosting converter. Here, the second transistor Q2 may be turned OFF, and the first, third, and fourth transistors Q1, Q3, and Q4 may be turned ON, whereby the first and second batteries BAT1 and BAT2 may be connected in parallel. Accordingly, the first and second batteries BAT1 and BAT2 may provide the output current $I_{OUT}$. At least one of the first and third transistors Q1 and Q3 may perform a current limiting function in relation to the first battery current IBAT1, and the fourth transistor Q4 may perform a current limiting function in relation to the second battery current IBAT2.

Figure 21:
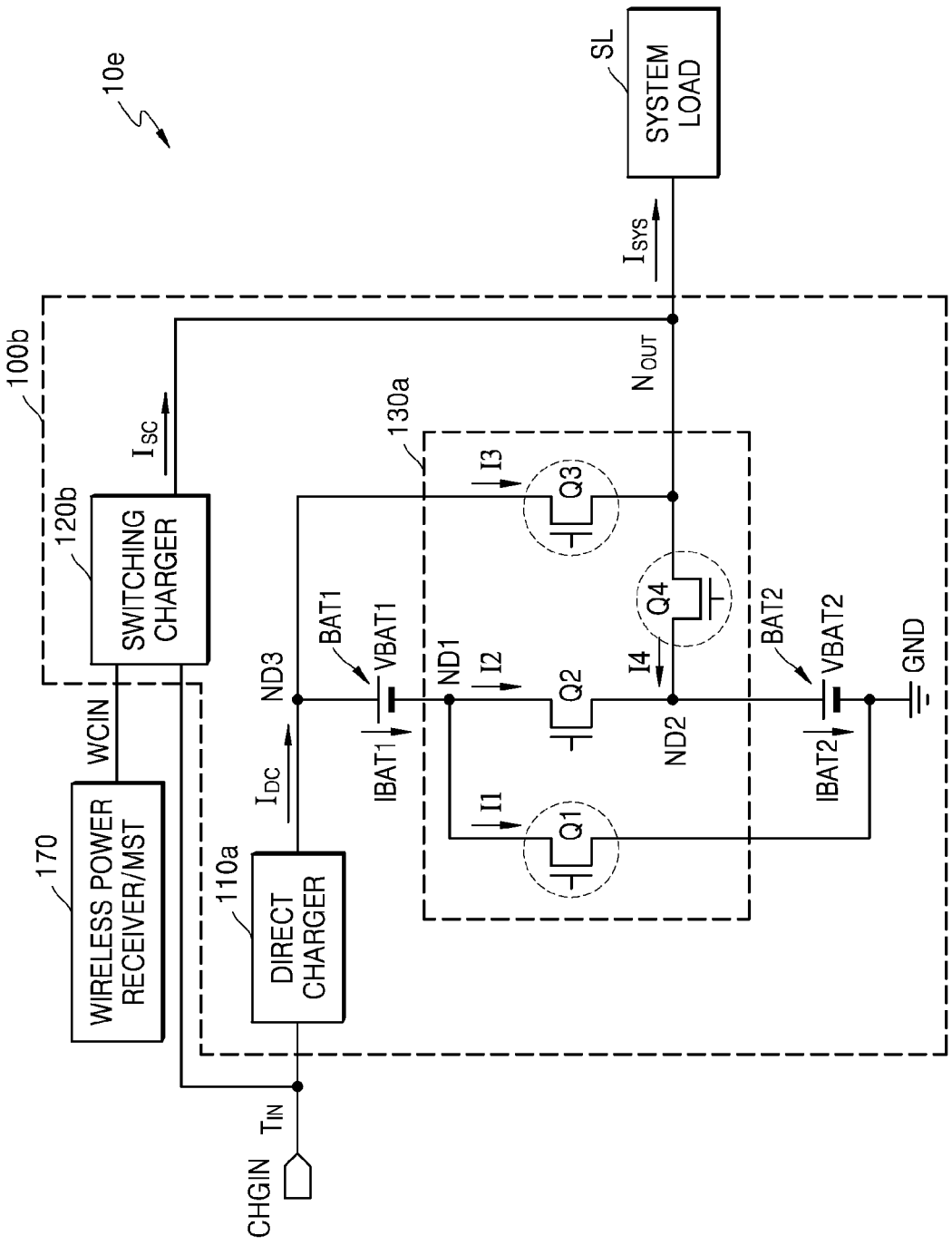
FIGS. 21, 22, 23 and 24 are respective block diagrams illustrating electronic devices according to embodiments of the inventive concept.

FIG. 21 is a block diagram illustrating an electronic device 10e according to embodiments of the inventive concept.

Referring to FIG. 21, the electronic device 10d is substantially similar to the electronic device 10a of FIG. 5, but further including a wireless power receiver 170. Here, a charger IC 100b may support a wired charging mode and a wireless charging mode. In the wired charging mode, the charger IC 100b may receive the input voltage CHGIN from an output terminal of a travel adapter TA through the input voltage terminal $T_{IN}$. In the wireless charging mode, the direct charger 110a may be inactivated, and the charger IC 100b may receive wireless power WCIN from the wireless power receiver 170. The wireless power receiver 170 may generate power using one of several well understood wireless charging approaches, such as magnetic induction, magnetic resonance, electromagnetic induction, and non-radiative wireless charging (WiTricity). In certain embodiments, the wireless power receiver 170 may include a wireless rectifier.

Thus, the wireless power receiver 170 may be implemented as a dual-purpose unit for both wireless charging and magnetic secure transmission (MST). As a result, the charger IC 100b may further support an MST mode, wherein MST is a technique by which, when the electronic device 10d containing credit card information is brought into direct or indirect contact with a credit card payment terminal (e.g., a point-of-sale (POS) terminal), the credit card payment terminal performs a payment process by automatically loading the credit card information contained in the electronic device 10d. Using a MST technique, the credit card information may be transferred to the credit card payment terminal using electro-magnetic signal(s). While operating in the MST mode, the direct charger 110a may be inactivated, and the charger IC 100b may be electrically connected to the wireless power receiver 170.

Figure 22:
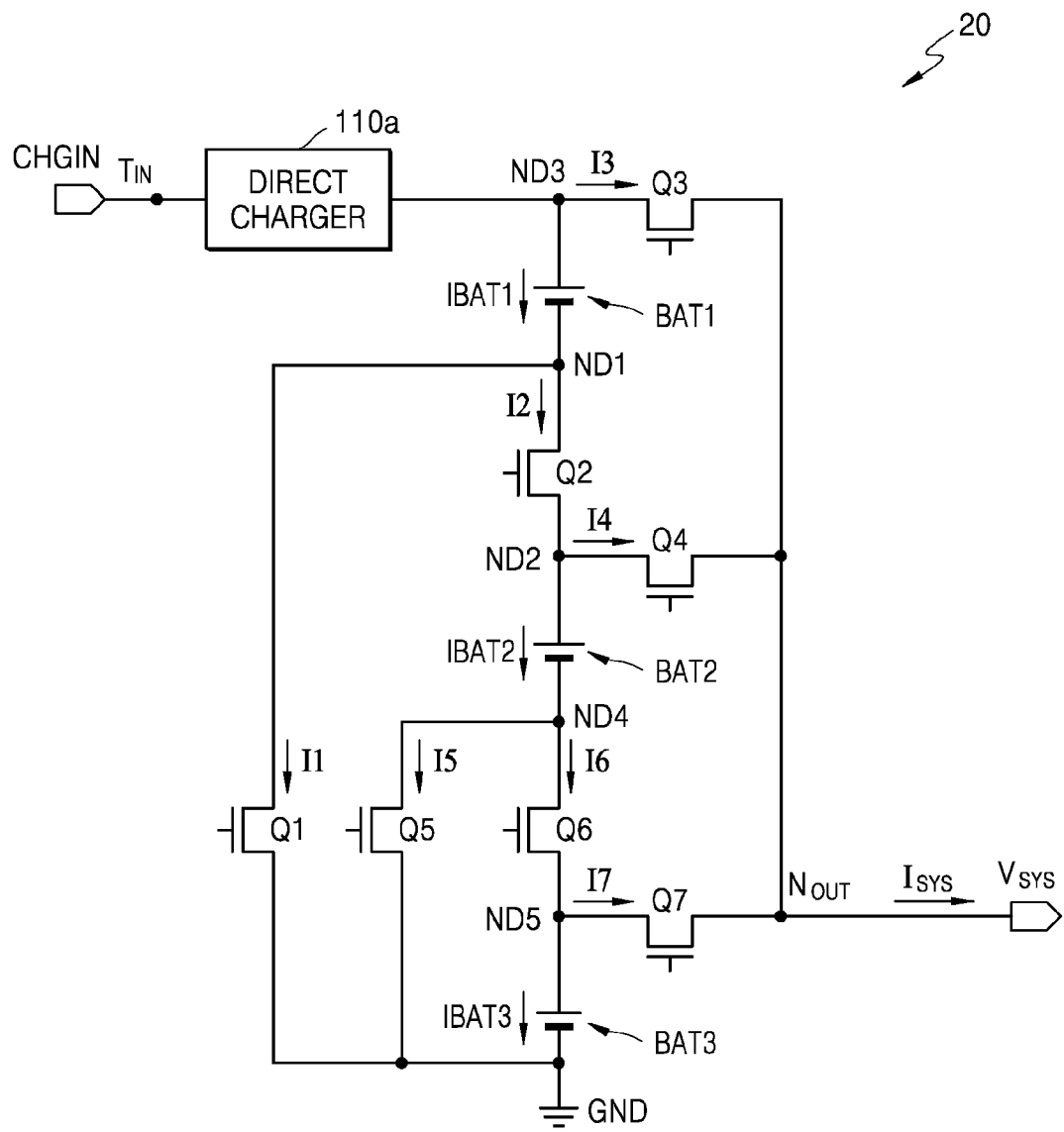

FIG. 22 is a block diagram illustrating an electronic device 20 according to embodiments of the inventive concept.

Referring to FIG. 22, the electronic device 20 is substantially similar to the electronic device 10a of FIG. 5, except it includes a third battery BAT3 in addition to the first battery BAT1 and the second battery BAT2. As a result, the electronic device 20 may include the direct charger 110a, first to seventh transistors Q1 to Q7, and the first to third batteries BAT1 to BAT3, wherein the configuration of the first to seventh transistors Q1 to Q7 constitutes a battery switch. However, the inventive concept is not limited thereto, and in some embodiments, the electronic device 20 may further include a switching charger in exchange for (or in addition to) the direct charger 110a.

The first transistor Q1 may be connected between the first node ND1, which is connectable to the negative terminal of the first battery BAT1, and the ground terminal GND. The second transistor Q2 may be connected between the first node ND1 and the second node ND2 which is connectable to the positive terminal of the second battery BAT2. The third transistor Q3 may be connected between the third node ND3, which is connectable to the positive terminal of the first battery BAT1, and the output node $N_{OUT}$. The fourth transistor Q4 may be connected between the second node ND2 and the output node $N_{OUT}$. The fifth transistor Q5 may be connected between the fourth node ND4, which is connectable to a negative terminal of the second battery BAT2, and the ground terminal GND. The sixth transistor Q6 may be connected between the fourth node ND4 and a fifth node ND5 which is connectable to a positive terminal of the third battery BAT3. The seventh transistor Q7 may be connected between the fifth node ND5 and the output node $N_{OUT}$.

By controlling the first to seventh transistors Q1 to Q7, the first to third batteries BAT1 to BAT3 may be connected in series or in parallel. At least one of the first and third transistors Q1 and Q3 may perform a current control function to limit the first battery current IBAT1 applied to the first battery BAT1. In an embodiment, at least one of the fourth and fifth transistors Q4 and Q5 may perform a current control function to limit the second battery current IBAT2 applied to the second battery BAT2, and the seventh transistor Q7 may perform a current control function to limit a third battery current IBAT3 applied to the third battery BAT3.

Accordingly, when a travel adapter TA is connected to the input voltage terminal $T_{IN}$, the first to third batteries BAT1 to BAT3 may be connected in series or in parallel. For example, when the input voltage CHGIN received from the input voltage terminal $T_{IN}$ can be precisely controlled, the first to third batteries BAT1 to BAT3 may be connected in series. However, when the input voltage CHGIN received from the input voltage terminal $T_{IN}$ cannot be precisely controlled, the first to third batteries BAT1 to BAT3 may be connected in parallel.

In addition, the first to third batteries BAT1 to BAT3 may be connected in series or in parallel according to difference(s) between both-end voltages of the first to third batteries BAT1 to BAT3. Further, during the charging of the first to third batteries BAT1 to BAT3, when the difference between the both-end voltages of the first to third batteries BAT1 to BAT3 exceeds a reference value, at least two of the first to third batteries BAT1 to BAT3 may be switched between a series connection and a parallel connection. For example, in the case where the first to third batteries BAT1 to BAT3 are being charged while the first to third batteries BAT1 to BAT3 are connected to each other in series, when the both-end voltage of the first battery BAT1 is greater than the both-end voltages of the second and third batteries BAT2 and BAT3 by as much as a reference value or more, the second transistor Q2 may be turned OFF, and the second and third batteries BAT2 and BAT3 may be connected to the first battery BAT1 in parallel.

Figure 23:
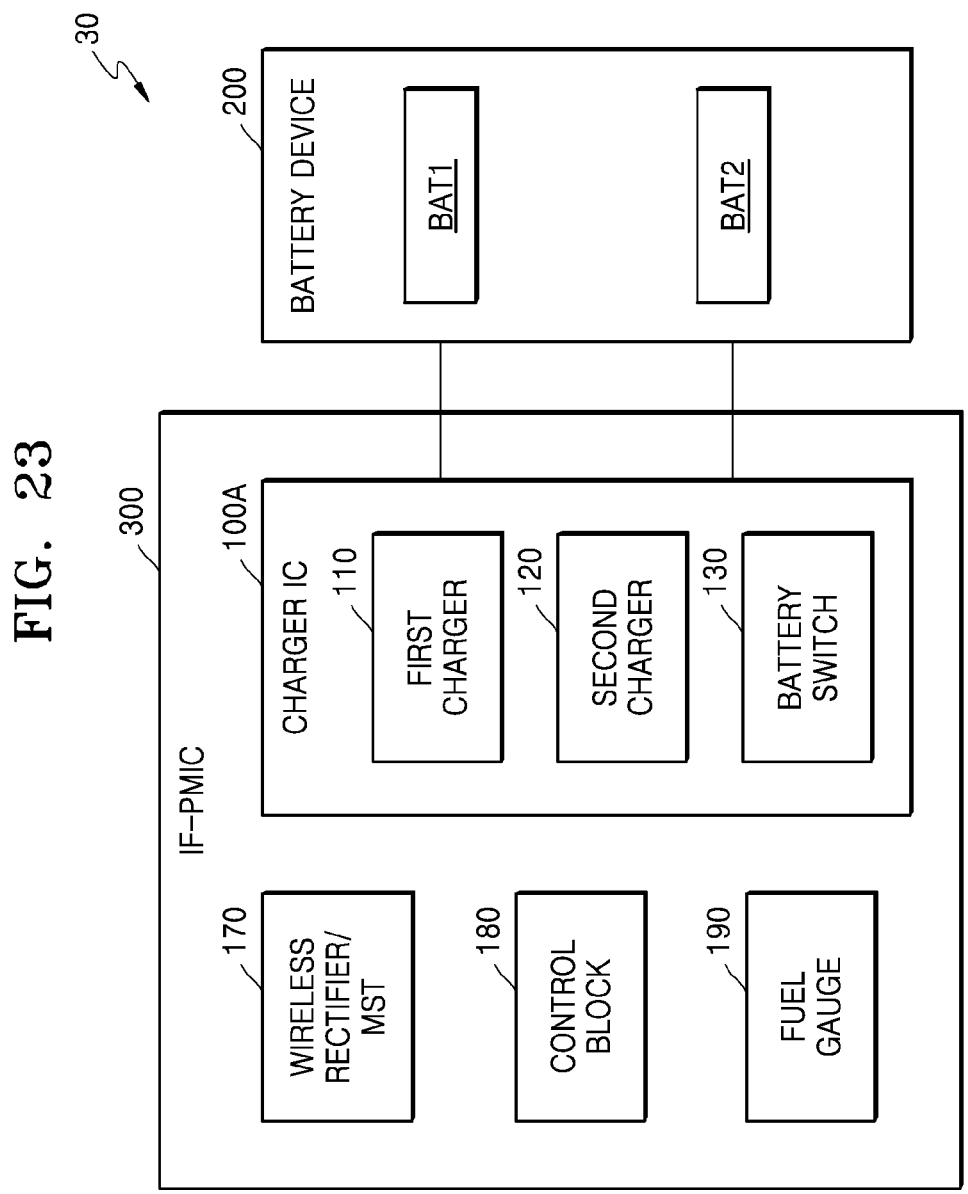

FIG. 23 is a block diagram illustrating an electronic device 30 according to embodiments of the inventive concept.

Referring to FIG. 23, the electronic device 30 may include an interface-power management integrated circuit (IF-PMIC) 300, and the battery device 200 may be mounted to the electronic device 30. The IF-PMIC 300 may include the charger IC 100A, the wireless power receiver 170, a control block 180, and a fuel gauge 190. The IF-PMIC 300 may further include a light-emitting diode (LED) driver, a USB type-C block, or the like.

The wireless power receiver 170 may be implemented as a dual-purpose unit for wireless charging and MST. The control block 180 may control operations of first and second chargers 110 and 120 and the battery switch 130. For example, the control block 180 may drive the first and second chargers 110 and 120 and switches or transistors included in the battery switch 130, according to at least one of the first to third charging modes and the first and second discharging modes. In addition, the control block 180 may control the voltage level of the input voltage CHGIN applied to the charger IC 100A. However, the inventive concept is not limited thereto, the functions of the control block 180 may be performed by a micro-controller unit (MCU), and the MCU may be provide external to the IF-PMIC 300.

The fuel gauge 190 may monitor the residual quantity, voltage, current, temperature, or the like of the battery device 200 and may be referred to as a "battery gauge". In an embodiment, the fuel gauge 190 may be connected to at least one sensing resistor, which is connected to at least one of the first and second batteries BAT1 and BAT2 included in the battery device 200, and thus may monitor a battery current flowing through at least one of the first and second batteries BAT1 and BAT2. However, the inventive concept is not limited thereto, and the fuel gauge 190 may also be disposed external to the IF-PMIC 300. In some embodiments, the fuel gauge 190 may be included in the battery device 200.

Figure 24:
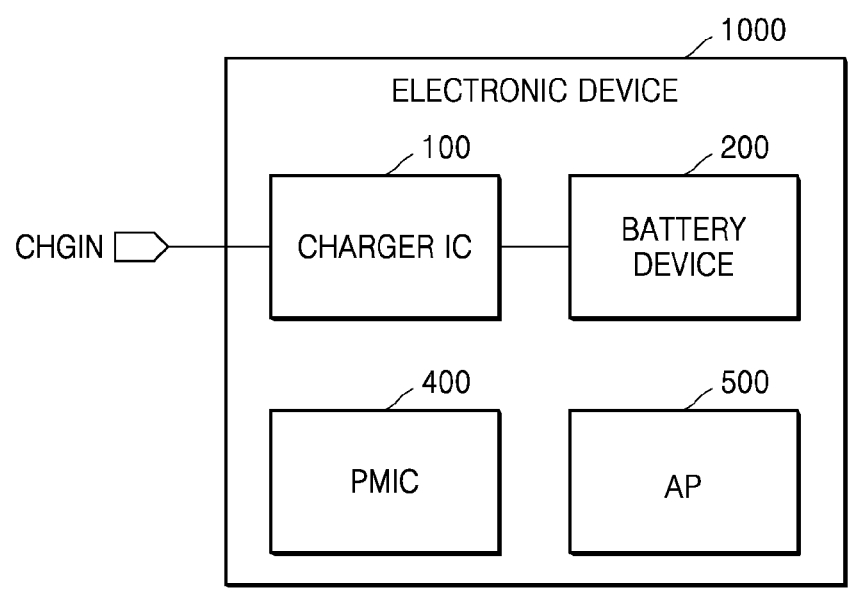

FIG. 24 is a block diagram illustrating an electronic device 1000 according to embodiments of the inventive concept.

Referring to FIG. 24, the electronic device 1000 may include the charger IC 100, the battery device 200, a PMIC 400, and an application processor 500. The electronic device 1000 may include the charger IC 100 for receiving power supplied from outside the electronic device 1000 and for charging the battery device 200. The charger IC 100 may be implemented according to the various embodiments illustrated in FIGS. 1 to 23.

The PMIC 400 may receive a battery voltage and may manage power required to drive the application processor 500. In addition, the PMIC 400 may be implemented to generate or manage voltages required for internal components of the electronic device 1000. According to some embodiments, the electronic device 1000 may include a plurality of PMICs including the PMIC 400. The PMIC 400 may receive the battery voltage from the battery device 200, receive a system voltage through the charger IC 100, and/or directly receive the input voltage CHGIN.

The application processor 500 may take overall control of the electronic device 1000. In an embodiment, the application processor 500 may control the charger IC 100, for example, may control the charger IC 100 in the first charging mode, the second charging mode, the third charging mode, the first discharging mode, or the second discharging mode. In an embodiment, when the electronic device 1000 is connected to a travel adapter TA, the application processor 500 may adjust the input voltage CHGIN provide by the travel adapter TA by communicating (wirelessly or wired) with the travel adapter TA. In certain embodiments, the application processor 500 may be implemented by a system-on-chip including one or more intellectual properties (IPs).

While the inventive concept has been particularly shown and described with reference to embodiments thereof, it will be understood that various changes in form and details may be made therein without departing from the spirit and scope of the following claims.

What is claimed is:

1. A charger integrated circuit (IC) for charging a battery device including a first battery and a second battery, the charger IC comprising:
   a first charger configured to generate a first charging current from an input voltage when the input voltage is received from an input voltage terminal; and
   a battery switch configured to provide the first charging current to the battery device, the battery switch comprising a plurality of transistors for connecting the first battery and the second battery in series or in parallel based on the input voltage, a first both-end voltage of the first battery and a second both-end voltage of the second battery, wherein:
   the plurality of transistors comprises:
      a first transistor connected between a first node and a ground terminal, the first node being configured to connect a negative terminal of the first battery;
      a second transistor connected between the first node and a second node, the second node being configured to connect a positive terminal of the second battery;
      a third transistor connected to a third node configured to connect a positive terminal of the first battery; and
      a fourth transistor connected between the second node and the third transistor,
   when the second transistor is turned ON, the first battery and the second battery are connected in series,
   when the first transistor, third transistor and fourth transistors are turned ON, the first battery and the second battery are connected in parallel, and
   a resistance value of the at least one of the first transistor and the third transistor is adjusted such that the first battery current does not exceed a first reference value or a resistance value of the fourth transistor is adjusted such that the second battery current does not exceed a second reference value.

2. The charger IC of claim 1, wherein at least one of the plurality of transistors performs a current control function limiting at least one of a first battery current applied to the first battery and a second battery current applied to the second battery.

3. The charger IC of claim 1, wherein the plurality of transistors further comprises a fifth transistor connected between a fourth node and an output node, the fourth node being between the third and fourth transistors, and the output node being configured to connect a load.

4. The charger IC of claim 1, wherein at least one of the first transistor and the third transistor performs a current control function limiting a first battery current applied to the first battery, or
the fourth transistor performs a current control function limiting a second battery current applied to the second battery.

5. The charger IC of claim 1, wherein when the first both-end voltage of the first battery is about equal to the second both-end voltage of the second battery, the second transistor is turned ON, the first transistor and the third transistor are turned OFF, and the first battery and the second battery are connected in series.

6. The charger IC of claim 5, wherein:
in a charging mode, the fourth transistor is turned OFF, and
in a discharging mode, the fourth transistor is turned ON.

7. The charger IC of claim 1, wherein when a difference between the first both-end voltage of the first battery and the second both-end voltage of the second battery is greater than or equal to a reference value, the first transistor, the third transistor, and the fourth transistor are turned ON, the second transistor is turned OFF, and the first battery and the second battery are connected in parallel.

8. The charger IC of claim 7, wherein:
when the first both-end voltage of the first battery is greater than the second both-end voltage of the second battery, a resistance value of the fourth transistor is adjusted such that a second battery current applied to the second battery does not exceed a second reference value, or
the first charger is further configured to limit the first charging current such that a first battery current applied to the first battery is less than the second battery current.

9. The charger IC of claim 7, wherein:
when the second both-end voltage of the second battery is greater than the first both-end voltage of the first battery, a resistance value of the first transistor is adjusted such that a first battery current applied to the first battery does not exceed a first reference value, or
the first charger is further configured to limit the first charging current such that the first battery current is greater than a second battery current applied to the second battery.

10. The charger IC of claim 1, wherein when the first charger does not receive the input voltage at the input voltage terminal, the first transistor, the third transistor, and the fourth transistor are turned ON, the second transistor is turned OFF, and the first battery and the second battery are connected in parallel.

11. The charger IC of claim 10, wherein:
when the second both-end voltage of the second battery is greater than the first both-end voltage of the first battery, a resistance value of the first transistor is adjusted such that a first battery current applied to the first battery does not exceed a first reference value, and
when the first both-end voltage of the first battery is greater than the second both-end voltage of the second battery, a resistance value of the fourth transistor is adjusted such that a second battery current applied to the second battery does not exceed a second reference value.

12. The charger IC of claim 1, further comprising:
a second charger configured to generate a second charging current from the input voltage when the input voltage is from the input voltage terminal, wherein:
when the input voltage has a fixed voltage level, the first charger is inactivated, the second charger is activated, and the battery switch connects the first battery and the second battery in parallel and provides the second charging current to the battery device, and
when the input voltage has a variable voltage level, the first charger is activated, and the battery switch provides the first charging current to the battery device.

13. The charger IC of claim 12, wherein the second charger comprises a switching charger.

14. The charger IC of claim 13, wherein the switching charger comprises:
a first switch, a second switch, and a third switch connected in series between the input voltage terminal and a ground terminal;
an inductor connected between a switching node and an output node, the switching node disposed between the second switch and the third switch, and the output node being configured to connect a system load; and
a fourth switch connected between the output node and the battery switch.

15. The charger IC of claim 1, wherein the first charger comprises a direct charger including at least one switch connected between the input voltage terminal and a node configured to connect a positive terminal of the first battery.

16. The charger IC of claim 1, further comprising a controller configured to control a resistance value of at least one of the plurality of transistors such that a current flowing through the at least one of the plurality of transistors does not exceed a reference value.

17. A charger integrated circuit (IC) for charging a battery device including a first battery and a second battery, the charger IC comprising:
a direct charger configured to generate a first charging current from an input voltage received from an input voltage terminal;
a switching charger configured to generate a second charging current from the input voltage; and
a battery switch configured to provide one of the first charging current and the second charging current to the battery device, wherein the battery switch comprises a plurality of transistors for connecting the first battery and the second battery in series or in parallel based on the input voltage, a first both-end voltage of the first battery, and a second both-end voltage of the second battery, the battery switch comprising:
a first transistor connected between a first node and a ground terminal, the first node being configured to connect a negative terminal of the first battery,
a second transistor connected between the first node and a second node, the second node being configured to connect a positive terminal of the second battery,
a third transistor connected to a third node connectable to a positive terminal of the first battery, and
a fourth transistor connected between the second node and the third transistor, wherein:
when the second transistor is turned ON, the battery switch connects the first battery and the second battery in series,
when the first transistor, the third transistor, and the fourth transistor are turned ON, the battery switch connects the first battery and the second battery in parallel, and
a resistance value of the at least one of the first transistor and the third transistor is adjusted such that the first battery current does not exceed a first reference value or a resistance value of the fourth transistor is adjusted such that the second battery current does not exceed a second reference value.

18. A battery switch connectable to a battery device including a first battery and second battery, the battery switch comprising:
   a first transistor connected between a first node and a ground terminal, the first node being configured to connect a negative terminal of the first battery;
   a second transistor connected between the first node and a second node, the second node being configured to connect a positive terminal of the second battery;
   a third transistor connected to a third node connectable to a positive terminal of the first battery; and
   a fourth transistor connected between the second node and the third transistor, wherein:
   when the second transistor is turned ON, the battery switch connects the first battery and the second battery in series,
   when the first transistor, the third transistor, and the fourth transistor are turned ON, the battery switch connects the first battery and the second battery in parallel, and a resistance value of the at least one of the first transistor and the third transistor is adjusted such that the first battery current does not exceed a first reference value or a resistance value of the fourth transistor is adjusted such that the second battery current does not exceed a second reference value.

19. The charger IC of claim 17, wherein:
   at least one of the first transistor and the third transistor performs a current control function limiting a first battery current applied to the first battery, or
   the fourth transistor performs a current control function limiting a second battery current applied to the second battery.

20. The battery switch of claim 18, wherein:
   at least one of the first transistor and the third transistor performs a current control function limiting a first battery current applied to the first battery, or
   the fourth transistor performs a current control function limiting a second battery current applied to the second battery.

* * * * *